US005583716A

United States Patent [19]
Akiba et al.

[11] Patent Number: 5,583,716
[45] Date of Patent: Dec. 10, 1996

[54] MAGNETIC DISK APPARATUS IN WHICH TWO DISK DRIVE UNITS WHICH ACCESS DIFFERENT SIZE DISKS ARE COMBINED

[75] Inventors: Takao Akiba, Ohmiya; Hidetoshi Kabasawa, Ogawamachi, both of Japan

[73] Assignee: Teac Corporation, Japan

[21] Appl. No.: 322,083

[22] Filed: Oct. 12, 1994

[30] Foreign Application Priority Data

| Oct. 15, 1993 | [JP] | Japan | 5-055912 U |
| Oct. 15, 1993 | [JP] | Japan | 5-055914 U |
| Oct. 15, 1993 | [JP] | Japan | 5-055915 U |
| Oct. 15, 1993 | [JP] | Japan | 5-055916 U |
| Oct. 15, 1993 | [JP] | Japan | 5-258724 |

[51] Int. Cl.⁶ ............ G11B 5/012; G11B 25/04; G11B 17/02
[52] U.S. Cl. ................ 360/99.01; 360/99.02; 360/99.04
[58] Field of Search ............ 360/97.01, 98.01, 360/98.04, 98.07–99.02, 99.04, 99.05, 99.06, 99.08, 99.12, 137; 369/75.1, 270, 271

[56] References Cited

U.S. PATENT DOCUMENTS

| 4,894,739 | 1/1990 | Kobayashi | 360/97.02 |
| 5,175,657 | 12/1992 | Iftikar et al. | 360/98.01 |
| 5,208,722 | 5/1993 | Ryan et al. | 360/99.01 |
| 5,469,421 | 11/1995 | Aruga et al. | 369/75.1 |

FOREIGN PATENT DOCUMENTS

| 58-211381 | 12/1983 | Japan | 360/97.01 |
| 1-150271 | 6/1989 | Japan | 360/99.01 |
| 4-57278 | 2/1992 | Japan | 360/99.01 |
| 4-18148 | 4/1992 | Japan . | |
| 4-121888 | 4/1994 | Japan . | |

Primary Examiner—Jefferson Evans
Attorney, Agent, or Firm—Andrus, Sceales, Starke & Sawall

[57] ABSTRACT

A magnetic disk apparatus includes a first disk drive unit capable of accessing a first-size disk contained in a first disk cartridge, and a second disk drive unit capable of accessing a smaller, second-size disk contained in a second disk cartridge, the second disk drive unit being attached to the first disk drive unit to form a single unit. The second disk drive unit comprises: a chassis having a size substantially equal to a size of the first disk drive unit; a disk motor which rotates the second-size disk of the second disk cartridge on the disk motor when the second-size disk is accessed; and a motor base attached to a bottom of the disk motor, the motor base including a control circuit to control the rotation of the disk motor. An entire top area of the first disk drive unit is covered with the chassis of the second disk drive unit, and an entire height of the second disk drive unit is substantially equal to an entire height of a conventional disk drive unit added to a thickness of a top plate.

3 Claims, 25 Drawing Sheets

FIG. IA PRIOR ART
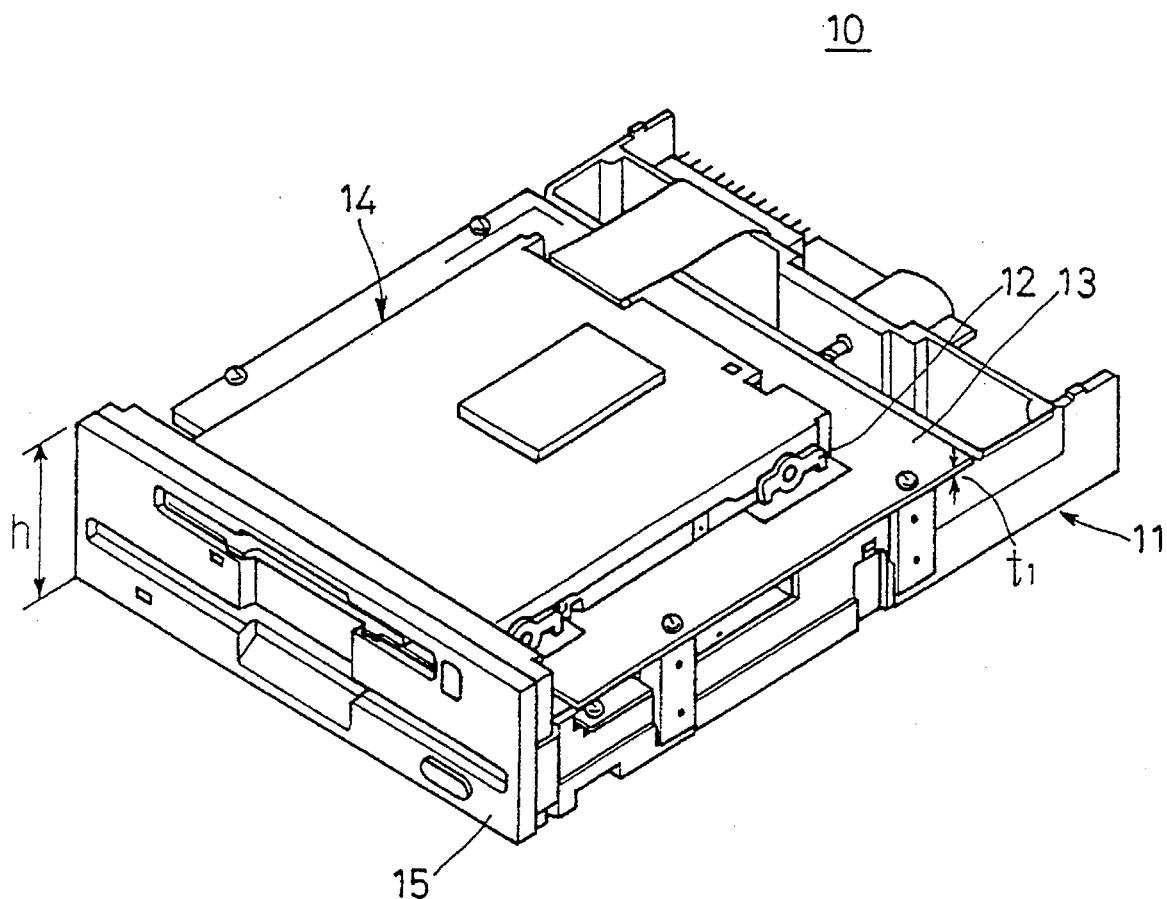

$t_1$ : 1 mm
b : 3.8 mm
$t_2$ : 0.6 mm

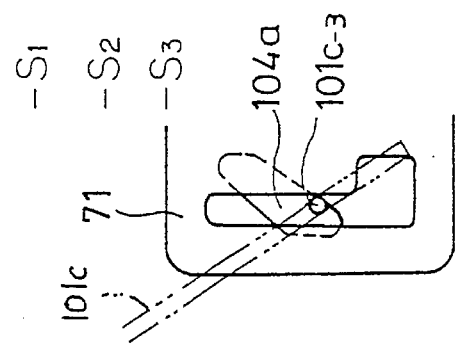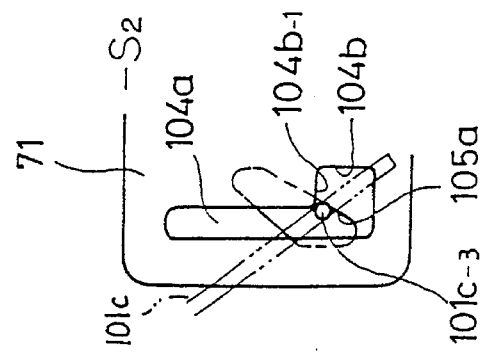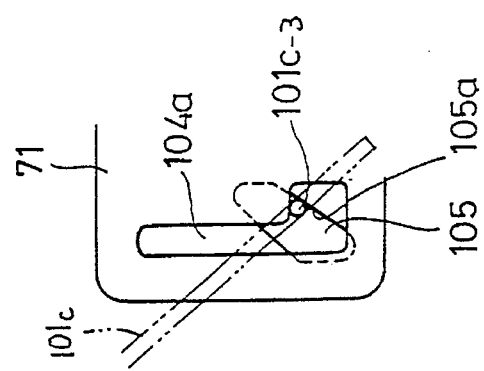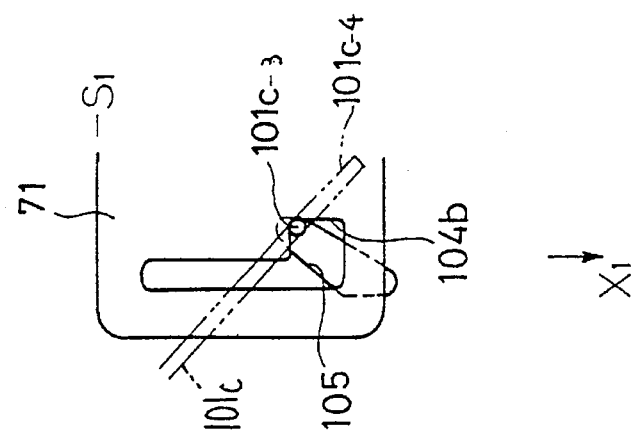

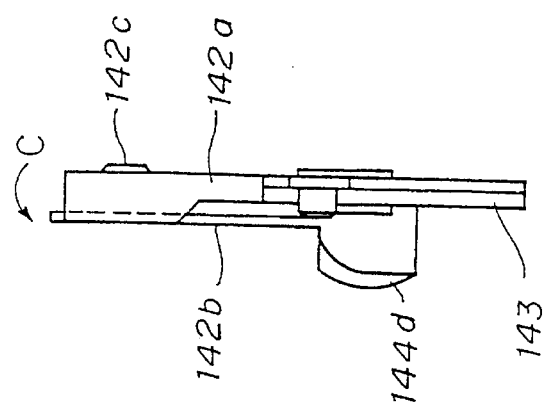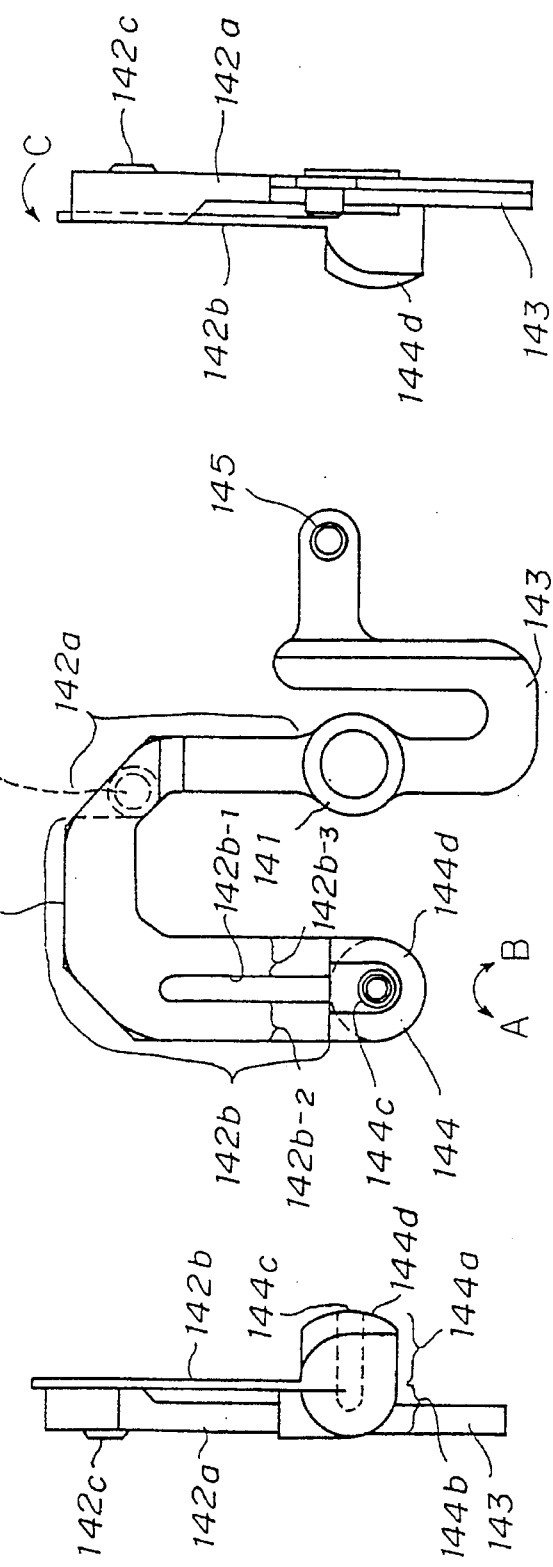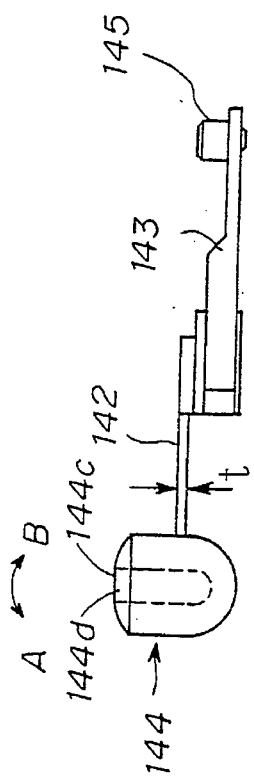

MAGNETIC DISK APPARATUS IN WHICH TWO DISK DRIVE UNITS WHICH ACCESS DIFFERENT SIZE DISKS ARE COMBINED

BACKGROUND OF THE INVENTION (1) Field of the Invention

The present invention generally relates to a magnetic disk apparatus, and more particularly to a magnetic disk apparatus which is built by combining a 3.5-inch disk drive unit and a 5-inch disk drive unit into a single unit that is capable of accessing both a 3.5-inch disk and a 5-inch disk.

(2) Description of the Prior Art

A magnetic disk device is built by combining a 3.5-inch disk drive unit and a 5-inch disk drive unit into a single unit which can access both a 3.5-inch disk and a 5-inch disk.

FIG. 1A shows a conventional magnetic disk device 10 in which a 3.5-inch disk drive unit 14 and a 5-inch disk drive unit 11 are combined. The 5-inch disk drive unit 11 includes a top plate 13 with a certain thickness. The top plate 13 has a mounting surface on which the 3.5-inch disk drive unit 14 is mounted by fixing units 12. A front panel 15 is arranged to cover the front face of the 5-inch disk drive unit 11 and the front face of the 3.5-inch disk drive unit 14. The front panel 15 has at its lower portion an insertion opening through which a 5-inch disk cartridge can be inserted, and has at its upper portion an insertion opening through which a 3.5-inch disk cartridge can be inserted.

It is necessary that the conventional magnetic disk device 10 has a given height "h", and the magnetic disk device can be housed in a personal computer. The top plate 13 of the 5-inch disk drive unit 11 must be rigid enough to safely support the 3.5-inch disk drive unit 14 thereon. Thus, it is necessary that the top plate 13 has a certain thickness t1, and the thickness of the top plate 13 is approximately 1 mm.

In the disk drive device 10 mentioned above, the 3.5-inch disk drive unit 14 and the 5-inch disk drive unit 11 must be assembled independently from each other.

FIG. 1B shows a disk motor 17 of the 3.5-inch disk drive unit 14 in the magnetic disk device 10. In FIG. 1B, the 3.5-inch disk drive unit 14 includes the disk motor 17, a chassis 20, a slider 21, a holder 22, and a cover 23. The disk motor 17 is arranged on a motor base 24 which is connected to an external interface circuit via a connecting cord. The chassis 20 has a recessed portion 20a at the bottom of the 3.5-inch disk drive unit 14. The motor base 24 is placed into the recessed portion 20a of the chassis 20. The motor base 24 does not project from the bottom of the chassis 20, and all the parts are placed so as to fall within the height of the 3.5-inch disk drive unit 14.

The disk motor 17 of the 3.5-inch disk drive unit 14 comprises a rotating shaft 30 rotatably supported by a set of bearings 31 and 32, a ring-like permanent magnet 36 fixed to the inside wall of a flat, cup-like yoke 33, and a stator coil 35 having an iron core 34 arranged on the motor base 24.

As the motor base 24 is placed into the recessed portion 20a of the chassis 20, the height (indicated by "a" in FIG. 1B) of the disk motor 17 becomes a small dimension. For this reason, the space in which the stator coil 35 and the permanent magnet 36 are placed is narrow. Further, the number of turns of wires of the stator coil 35 is limited, and the height (indicated by "b" in FIG. 1B) of the permanent magnet 36 must not exceed 3.8 mm.

There is a need for a magnetic disk device which is compact and low in the manufacturing cost. Further, in order to obtain a disk motor having the required magnetic characteristics while satisfying the need for the magnetic disk device which is compact and low in the manufacturing cost, it is necessary that the conventional magnetic disk device 10 uses a permanent magnet with an increased concentration of a certain component element in the permanent magnet. However, providing the permanent magnet having the increased concentration of the above component element makes the manufacturing cost of the magnetic disk device high.

In addition, when the magnetic disk device mentioned above is assembled, adjusting operations for the 3.5-inch disk drive unit must be performed twice; after the assembly of the 3.5-inch disk drive unit is completed and also after the 3.5-inch disk drive unit is attached to the 5-inch disk drive unit. Such adjusting operations are time consuming, and the manufacturing cost of the magnetic disk device is unnecessarily raised due to these operations.

SUMMARY OF THE INVENTION

Accordingly, it is a general object of the present invention to provide an improved magnetic disk apparatus in which the above described problem is eliminated.

Another, more specific object of the present invention is to provide a magnetic disk apparatus which has a structure which enables efficient assembly of the magnetic disk apparatus with a smaller number of manufactured parts while satisfying the need for an apparatus which is compact and low in the manufacturing cost.

Still another object of the present invention is to provide a magnetic disk apparatus which has a slider latching mechanism which enables efficient assembly of the apparatus with a smaller number of manufactured parts, and which is designed to satisfy the need for an apparatus which is compact and low in the manufacturing cost.

A further object of the present invention is to provide a magnetic disk apparatus which has a slider braking mechanism which enables a safe and reliable setting of an inserted disk cartridge, and which is designed to satisfy the need for an apparatus which is compact and low in the manufacturing cost.

Another object of the present invention is to provide a magnetic disk apparatus which has a cartridge impact preventing mechanism which enables a safe and reliable holding of an inserted disk cartridge and prevents the disk cartridge from impacting a magnetic head when the disk cartridge is set to a read/write position, and which is designed to satisfy the need for an apparatus which is compact and low in the manufacturing cost.

Still another object of the present invention is to provide a magnetic disk apparatus which has an impact preventing mechanism which enables a safe and reliable holding of a head carriage unit and prevents the head carriage unit from impacting a supporting wall of a chassis, and which is designed to satisfy the need for an apparatus which is compact and low in the manufacturing cost.

The above mentioned object of the present invention is achieved by a magnetic disk apparatus which includes: a first disk drive unit capable of accessing a first-size disk contained in a first disk cartridge; and a second disk drive unit capable of accessing a smaller, second-size disk contained in a second disk cartridge, the second disk drive unit being attached to the first disk drive unit to form a single unit. The second disk drive unit comprises: a chassis having a size substantially equal to a size of the first disk drive unit;

a disk motor which rotates the second-size disk of the second disk cartridge on the disk motor when the second-size disk is accessed; and a motor base attached to a bottom of the disk motor, the motor base including a control circuit to control the rotation of the disk motor. An entire top area of the first disk drive unit is covered with the chassis of the second disk drive unit, and an entire height of the second disk drive unit is substantially equal to an entire height of a conventional disk drive unit added to a thickness of a top plate.

According to the present invention, it is possible to realize efficient assembly of the magnetic disk apparatus with a smaller number of manufactured parts while satisfying the need for an apparatus which is compact and low in the manufacturing cost. In addition, it is possible to realize a magnetic disk apparatus including a slider latching mechanism which enables efficient assembly of the apparatus with a smaller number of manufactured parts, and which satisfies the need for an apparatus which is compact and low in the manufacturing cost. In addition, it is possible to realize a magnetic disk apparatus including a slider braking mechanism which enables a safe and reliable setting of an inserted disk cartridge, and which satisfies the need for an apparatus which is compact and low in the manufacturing cost. In addition, it is possible to realize a magnetic disk apparatus including a cartridge impact preventing mechanism which enables a safe and reliable holding of an inserted disk cartridge and prevents the disk cartridge from impacting a magnetic head, and which satisfies the need for an apparatus which is compact and low in the manufacturing cost. Further, it is possible to realize a magnetic disk apparatus including an impact preventing mechanism which enable a safe and reliable holding of a head carriage unit and prevents the head carriage unit from impacting a supporting wall of a chassis, and which satisfies the need for an apparatus which is compact and low in the manufacturing cost.

BRIEF DESCRIPTION OF THE DRAWINGS

The above and other objects, features and advantages of the present invention will be more apparent from the following detailed description when read in conjunction with the accompanying drawings in which:

FIG. 1A is a perspective exploded view of a conventional magnetic disk device;

FIGS. 13A through 13D are diagrams for explaining the operation of the slider braking mechanism in FIG. 9;

FIGS. 17A through 17D are views of a disk cartridge guide member of the cartridge impact preventing mechanism in FIG. 14;

DESCRIPTION OF THE PREFERRED EMBODIMENTS

A description will now be given of a magnetic disk apparatus in the first embodiment of the present invention, with reference to FIGS. 3 through 5.

Hereinafter, the dimensions of a magnetic disk apparatus and its component parts in the vertical direction, in the horizontal transversal direction, and in the horizontal longitudinal direction will be referred to as the height, the width, and the length, respectively, for the sake of convenience.

Figure 3:
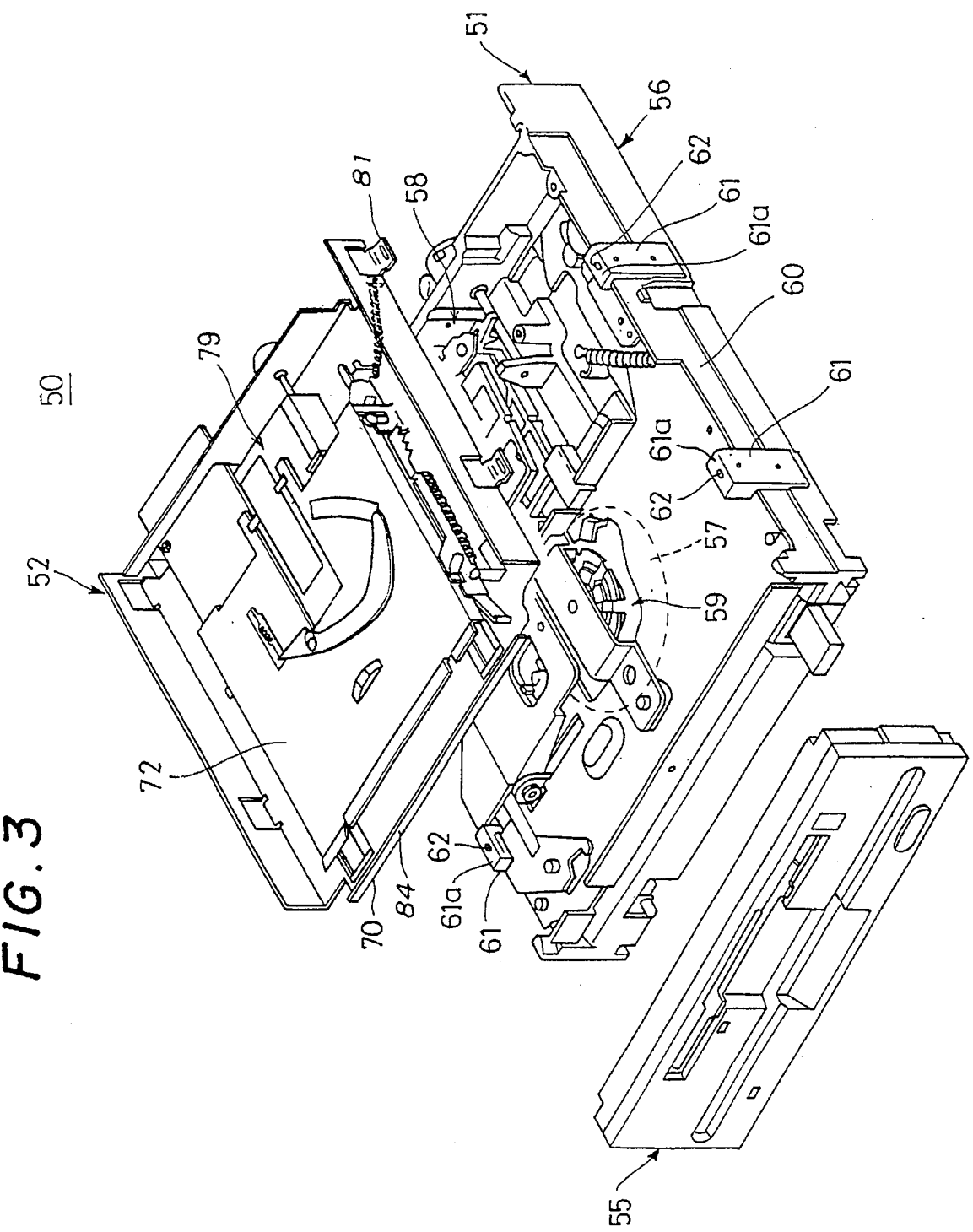
FIG. 3 is a perspective exploded view of a magnetic disk apparatus in a first embodiment of the present invention.

FIG. 3 is an exploded view of a magnetic disk apparatus 50 in the first embodiment of the present invention. This apparatus 50 is built by combining a 5-inch disk drive unit 51 and a 3.5-inch disk drive unit 52 into a one-piece unit. A front panel 55 is arranged to cover the front of the 5-inch disk drive unit 51 and the front of the 3.5-inch disk drive unit 52.

Figure 4:
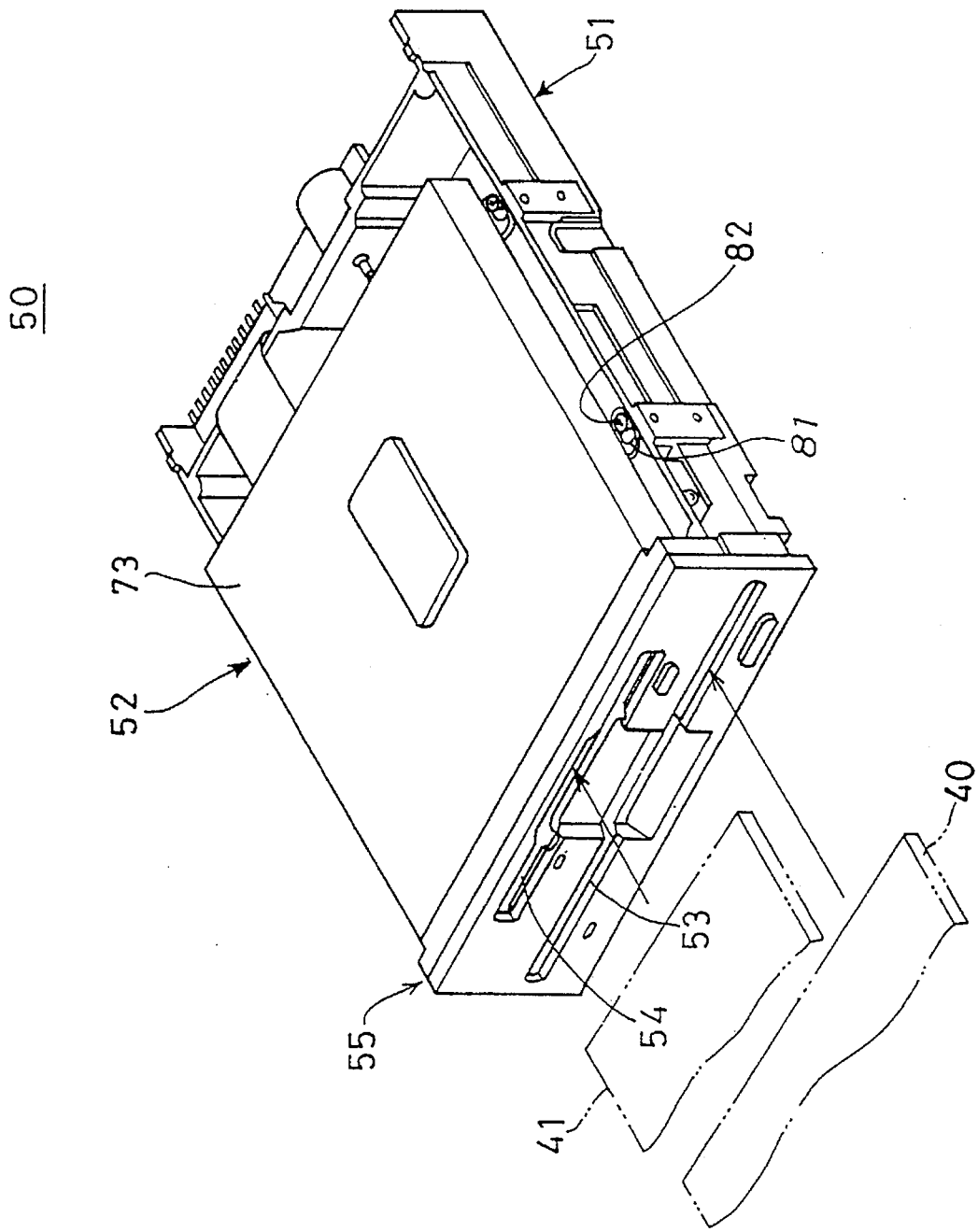
FIG. 4 is a perspective view showing an assembled condition of the magnetic disk apparatus in FIG. 3.

FIG. 4 shows an assembled condition of the magnetic disk apparatus 50. In FIG. 4, the front panel 55 has at its lower portion an insertion opening 53 through which a 5-inch disk cartridge 40 is inserted, and has at its upper portion an insertion opening 54 through which a 3.5-inch disk cartridge 41 is inserted. The height of the front panel 55 is the same as the height of the front panel of the conventional magnetic disk apparatus.

In FIG. 3, the 5-inch disk drive unit 51 is assembled by fitting a disk motor 57, a head carriage unit 58, and a disk clamp unit 59 onto a die-cast chassis 56. The chassis 56 has side walls 60 at sides thereof, and each of the side walls 60 has two supporting columns 61 attached to the side wall. Each of the four supporting columns 61 has a top surface 61a, and a threaded hole 62 is formed in the middle of the top surface. As a chassis 70 of the 3.5-inch disk drive unit 52 is wide enough to cover the top of the 5-inch disk drive unit 51, the 5-inch disk drive unit 51 has no top plate covering an entire top area of the 5-inch disk drive unit 51.

Figure 5:
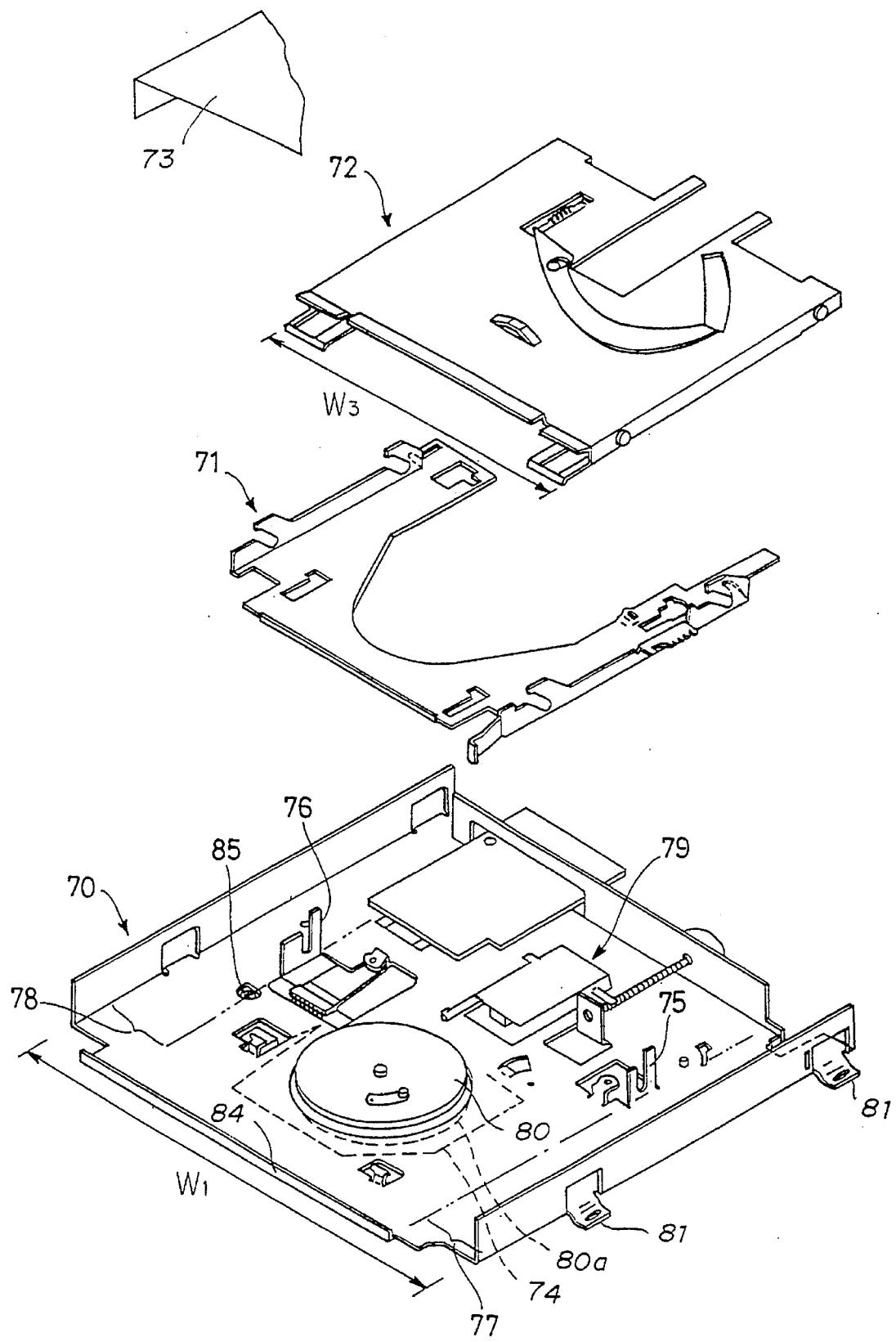
FIG. 5 is a perspective exploded view of a 3.5-inch disk drive unit of the magnetic disk apparatus in FIG. 3.

FIG. 5 is an exploded view of the 3.5-inch disk drive unit 52 of the first embodiment shown in FIG. 3. In FIG. 5, a slider 71, a holder 72, and a top cover 73 are fitted together on the chassis 70 of the 3.5-inch disk drive unit 52. Each of the slider 71 and the holder 72 has a size equivalent to the size of the 3.5-inch disk cartridge 52.

The chassis 70 of the 3.5-inch disk drive unit 52 has a width W1 that is equivalent to the width of the 5-inch disk drive unit 51, as shown in FIG. 5. The chassis 70 has holder supporting portions 75 and 76 and extended surface portions 77 and 78. The supporting portions 75 and 76 vertically extend and the holder 72 is supported on the holder supporting portions 75 and 76 when the holder 72 is fitted onto the chassis 70. The chassis 70 is wider than the holder 72 in the horizontal transversal direction. The extended surface portions 77 and 78 horizontally extend from around the holder supporting portions 75 and 76 in the horizontal transversal direction respectively.

A disk motor 80 and a head carriage unit 79 for the 3.5-inch disk are arranged in the middle of the chassis 70. The chassis 70 is formed integrally with four leg portions 81 which transversely extend from both the sides of the chassis 70.

The height of the chassis 70 in the magnetic disk apparatus 50 is approximately equal to the height of the chassis in the 3.5-inch disk drive unit 14. In order to increase the stiffness of the chassis 70 having the width W1, the chassis 70 is formed at its front edge with a reinforcement rib 84, as shown in FIG. 5.

When the 3.5-inch disk drive unit 52 is arranged on the 5-inch disk drive unit 51, the leg portions 81 are brought into contact with the top surfaces of the supporting columns 61 of the 5-inch disk drive unit 51. Four machine screws 82 are fitted into the threaded holes 62 of the supporting columns 61 and fastened so that the 3.5-inch disk drive unit 52 is firmly attached to the top of the 5-inch disk drive unit 51. The top surface of the 5-inch disk drive unit 51 is covered with the chassis 70 of the 3.5-inch disk drive unit 52 after the assembly mentioned above is performed.

The height of the chassis 70 of the 3.5-inch disk drive unit 52, arranged on the top of the 5-inch disk drive unit 51, is essentially the same as the height of the chassis of the 3.5-inch disk drive unit in the above conventional magnetic disk apparatus.

Performance of adjusting operations for the parts of the 3.5-inch disk drive unit 52 is necessary only once after the disk drive unit 52 is attached to the disk drive unit 51.

In FIG. 5, a positioning screw 85 is provided in a hole in the chassis 70, and this screw is used to adjust the fitted position of the 3.5-inch disk drive unit 52 over the 5-inch disk drive unit 51. The positioning screw 85 is located in the extended surface portion 78 of the chassis 70, and the hole thereof is exposed at a location outwardly deviating from the side of the holder 72. An index mark on the 5-inch disk drive unit 51 can be easily viewed from above through the hole of the positioning screw 85 after the 3.5-inch disk drive unit 52 is fitted on the 5-inch disk drive unit 51. Thus, the fitted position of the disk drive unit 52 to the disk drive unit 51 can be easily and accurately adjusted by loosening and re-tightening the positioning screw 85.

The 3.5-inch disk drive unit 52 includes a motor base 74 to which the disk motor 80 is attached. The motor base 74 is provided on the bottom of the chassis 70, and an upper portion of the disk motor 80 is exposed from an opening 80a of the chassis 70 over the surface of the chassis 70. As the 5-inch disk drive unit 51 does not require a top plate, the chassis 70 can have a height sufficient to enable the disk motor 80 to be included in the 3.5-inch disk drive unit 52 while satisfying the need for a magnetic disk apparatus which is compact and low in the manufacturing cost. Further, the motor base 74 on the bottom of the disk motor 80 comes into contact with the top of the 5-inch disk drive unit 51.

The disk motor 80 of the 3.5-inch disk drive unit 52 comprises a rotating shaft rotatably supported by a set of bearings, a ring-like permanent magnet fixed to the inside peripheral wall of a yoke, and a stator coil with its iron core arranged on the motor base 74. As the disk drive unit 51 has no top plate, the height of the disk motor 80 can be increased to a height greater than that of the above conventional device.

In order to satisfy the need for a magnetic disk device which is compact and to maintain the required magnetic characteristics of the disk motor, it is necessary that the permanent magnet of the conventional device be reduced in thickness by increasing a concentration of a certain component element in the permanent magnet. However, increasing the concentration of the above component element in the permanent magnet makes the manufacturing cost of the conventional device high.

In the first embodiment of the present invention, the disk motor 80 can have a sufficient thickness without the need to increase the concentration of the above component element in the permanent magnet. Further, it is possible to satisfy the need for a magnetic disk apparatus which is compact and low in the manufacturing cost and to realize an efficient assembly of the apparatus with a smaller number of manufactured parts.

Figure 1B:
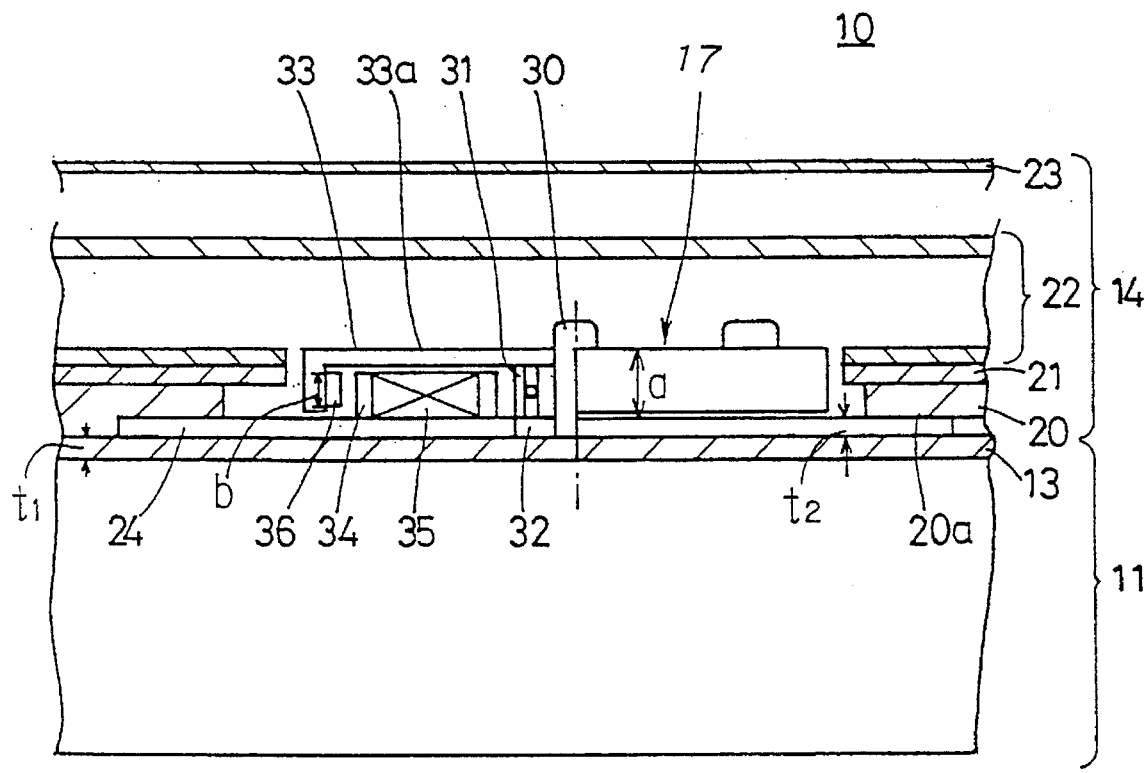
FIG. 1B is a sectional view showing the conventional magnetic disk device in FIG. 1A.

A sheet plate of the chassis 70 in the first embodiment may be thicker than a sheet plate of the chassis in the conventional device in FIG. 1A. Thus, the 3.5-inch disk drive unit 52 having the chassis 70 in the first embodiment can have a higher vibration resistance than the above conventional device. The bottom of the motor base 74 in the first embodiment is located at a position equivalent to the position of the bottom of the top plate 13 of the conventional device in FIG. 1A. The motor base 74 can be located at a position that is lower than the position of the motor base of the above conventional device by a height equivalent to the height of the top plate 13.

As the position of the motor base 74 in the first embodiment can be lower than the position of the motor base in the above conventional device, the height of the disk motor 80 in the first embodiment can be greater than the height of the disk motor in the above conventional device. Thus, it is not necessary to make the thickness of the permanent magnet of the disk motor 80 smaller by using a permanent magnet with an increased concentration of the above component element in the permanent magnet. Further, the permanent magnet of the disk motor 80 is inexpensive as compared with the permanent magnet of the disk motor in the above conventional device, and the thickness of the permanent magnet in the first embodiment is greater than the thickness of the permanent magnet in the above conventional device. In addition, because of the increased height of the disk motor 80, the number of turns of wires of the stator coil of the disk motor 80 in the first embodiment can be made greater than the number of turns of wires of the stator coil of the disk motor in the above conventional device.

Accordingly, the disk motor 80 in the first embodiment is inexpensive as compared with the disk motor in the above conventional device. Further, since the 5-inch disk drive unit 51 in the first embodiment has no top plate and it is necessary to perform the adjusting operations for the parts of the 3.5-inch disk drive unit 52 only once, the manufacturing cost of the first embodiment is remarkably less than the manufacturing cost of the conventional device. In addition, the number of the required parts of the magnetic disk apparatus 50 in the first embodiment is less than that of the conventional device.

Figure 2A:
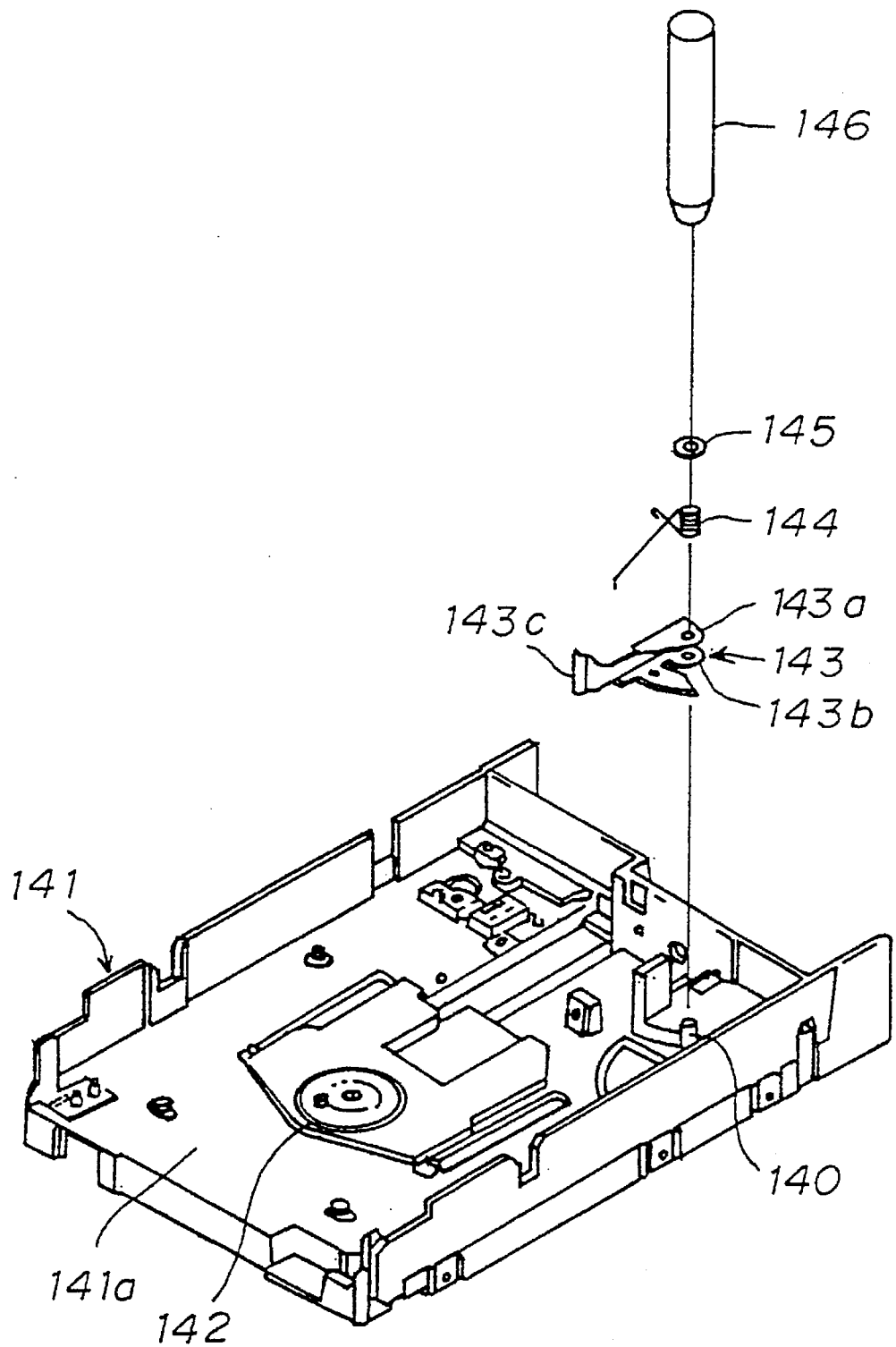
FIGS. 2A through 2D are diagrams showing various mechanisms of conventional magnetic disk devices.

Next, a description will be given of a slider latching mechanism of a conventional disk drive device, with reference to FIG. 2A, for the sake of comparative analysis with the present invention. FIG. 2A shows a slider latching mechanism of a conventional disk drive device.

Generally, a slider and a holder are arranged on a chassis of the disk drive device, and the slider is latched at a given latch position by using a latch lever. When a disk cartridge is inserted into the disk drive device and the disk cartridge is held by the holder, the latch lever is pushed by the disk cartridge to make the slider slide in an insertion direction. After the disk cartridge is inserted and held by the holder, the slider is latched by the latch lever. When an eject button is depressed, the slider is released from the latch lever and the disk cartridge in the holder is ejected from the disk drive device.

In FIG. 2A, a chassis 141 of the disk drive unit 14 has a surface plate 141a, and a drive motor 142 which is projecting from a motor base (not shown) is arranged on the surface plate 141a from an opening of the surface plate 141a. A mounting pin 140 is arranged on the surface plate 141a at a given position, and a latch lever 143 is fitted onto the mounting pin 140 on the surface plate 141a.

The latch lever 143 comprises a pair of supporting holes 143a and 143b and a contact portion 143c. The mounting pin 140 is inserted into the supporting holes 143a and 143b of the latch lever 143 so that the latch lever 143 is rotatably supported by the mounting pin 140 on the chassis 141. When a 3.5-inch disk cartridge when it is inserted in the 3.5-inch disk drive unit 14, the leading edge of the disk cartridge is brought into contact with the contact portion 143c of the latch lever 143. That is, the contact portion 143c is pushed by the disk cartridge when it is inserted.

In the 3.5-inch disk drive unit in FIG. 2A, a torsion spring 144, a ring mounting member 145 and an E-ring 146 are attached to the latch lever 143. The torsion spring 144 is provided to give a biasing force to rotate the latch lever 143 around the pin 140. The E-ring 146 is attached to the latch lever 143 by using the ring mounting member 145. In order to prevent the removal of the latch lever 143 from the chassis 141, it is necessary that the E-ring 146 be attached to the latch lever 143.

There is the need for a magnetic disk apparatus which is compact and low in the manufacturing cost, which apparatus is built by combining two disk drive units of different types into a single unit. However, it is necessary to fit together various parts to assemble the above conventional device including the slider latching mechanism, which assembly of the above conventional device is time consuming and somewhat difficult to perform.

Next, a description will be given of the magnetic disk apparatus in the second embodiment of the present invention, with reference to FIGS. 6 through 8. The magnetic disk apparatus in the second embodiment includes a slider latching mechanism which enables efficient assembly of the apparatus with a smaller number of manufactured parts while satisfying the need for the apparatus which is compact and low in the manufacturing cost.

Figure 6:
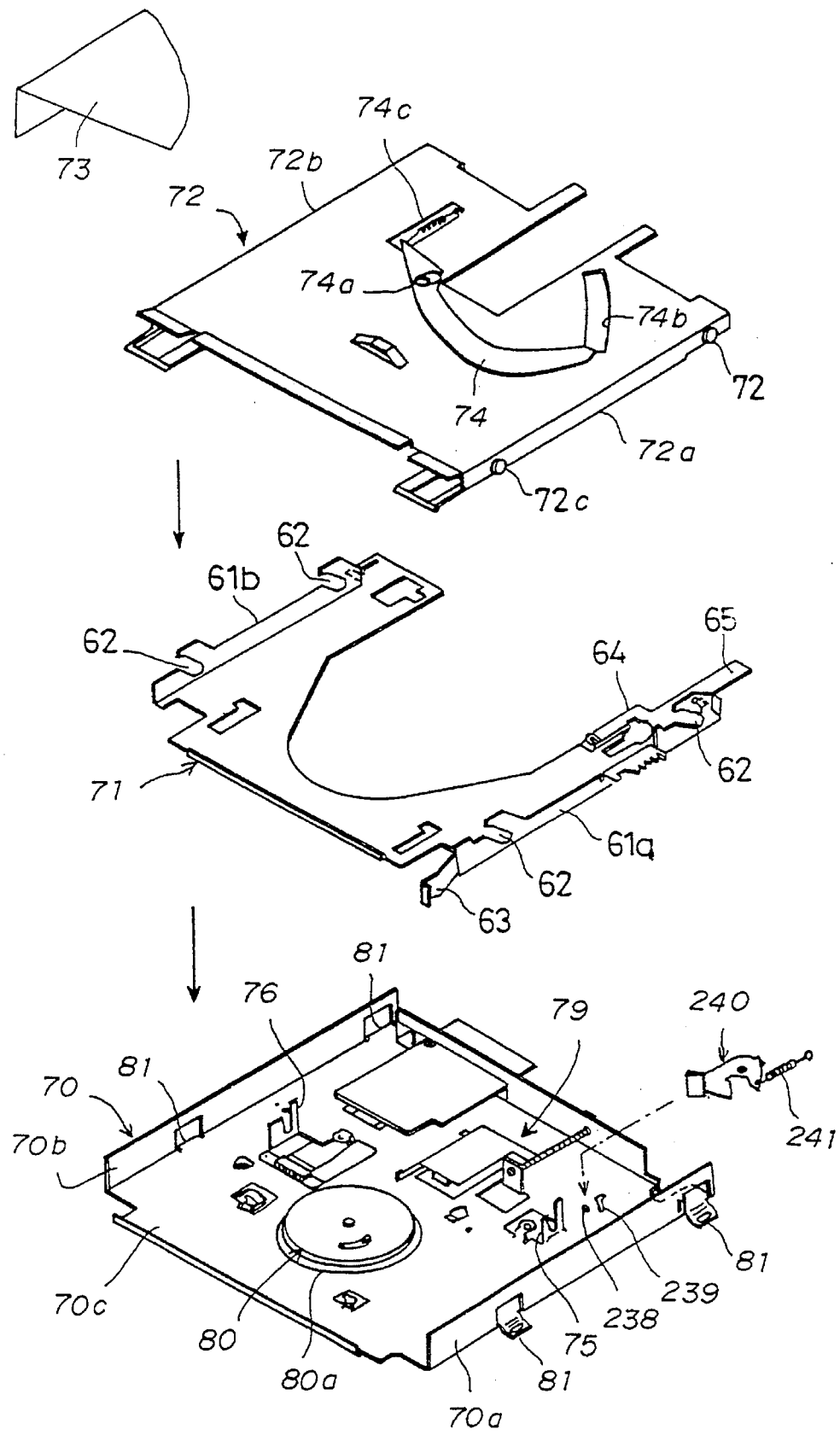
FIG. 6 is a perspective exploded view of a 3.5-inch disk drive unit of a magnetic disk apparatus in a second embodiment of the present invention.

FIG. 6 shows a 3.5-inch disk drive unit of the magnetic disk apparatus in the second embodiment. In FIG. 6, a slider 71, a holder 72 and a cover 73 are arranged on a die-cast chassis 70 of the 3.5-inch disk drive unit. Each of the slider 71, the holder 72 and the cover 73 has a size equivalent to that of the 3.5-inch disk cartridge 41.

In FIG. 6, a disk motor 80 and a head carriage unit 79 are arranged on the chassis 70 so that the 3.5-inch disk drive unit 52 accesses a 3.5-inch disk contained in the 3.5-inch disk cartridge. The 3.5-inch disk drive unit 52 includes a motor base on which the disk motor 80 is mounted. The motor base is provided on the bottom of the chassis 70, and an upper portion of the disk motor 80 is arranged from an opening 80a of the chassis 70 on the surface of the chassis 70. The motor base is electrically connected to an input/output interface board via a connecting cord.

Figure 7A:
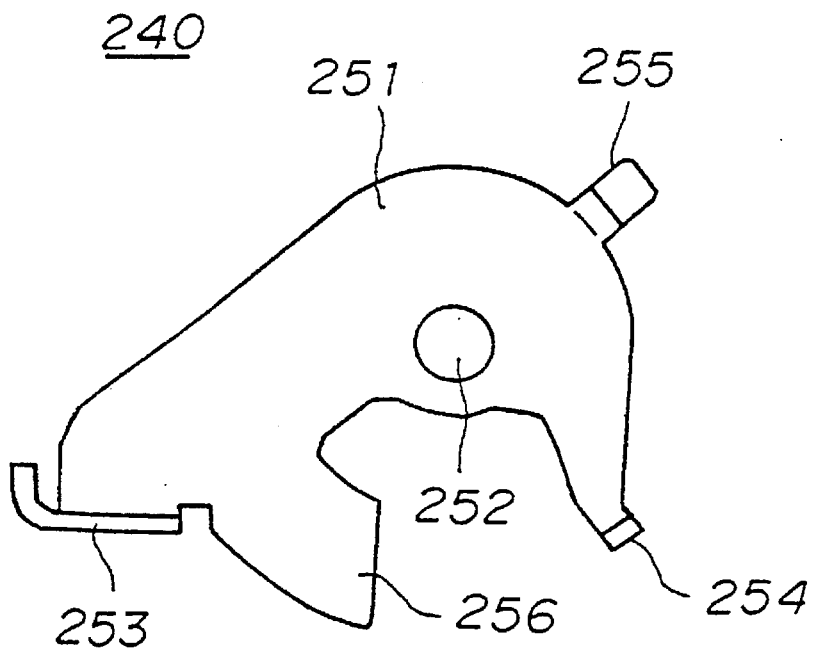
FIGS. 7A and 7B are top and side views of a latch lever of the disk drive unit in FIG. 6.
Figure 7B:
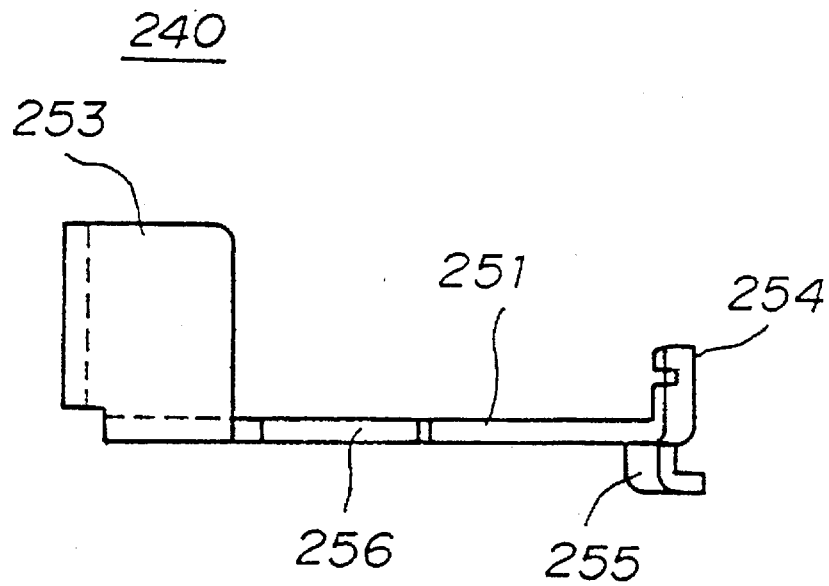

FIGS. 7A and 7B show a latch lever 240 which is rotatably supported on the chassis 70 in FIG. 6. The latch lever 240 serves to latch the slider 71 at a given latch position on the chassis 70. In FIGS. 7A and 7B, the latch lever 240 comprises a rotating body 251, a central hole 252, a contact portion 253, and an engagement portion 255. The rotating body 251 is rotatable around the central hole 252. The contact portion 253 is pushed by the leading edge of the 3.5-inch disk cartridge when it is inserted. The engagement portion 255 is slidably engaged with the chassis 70.

As shown in FIG. 6, the latch lever 240 is arranged on the chassis 70 with a coil spring 241. The latch lever 240 further comprises a hook portion 254. The coil spring 241 is connected at one end with the hook portion 254, and is connected at the other end with a side wall 70a of the chassis 70.

The chassis 70 is formed with a projection 238 and a semi-circular guide opening 239 in the surface plate 70c at given positions. The central hole 252 of the latch lever is fitted into the projection 238, and the engagement portion 255 of the latch lever is slidably engaged with the guide opening 239 of the chassis.

As shown in FIGS. 7A and 7B, the engagement portion 255 of the latch lever 40 is L-shaped in its cross-section. The engagement portion 255 extends outward and downward from the bottom of the rotating body 251, and the hook portion 254 extends upward from the rotating body 251. The latch lever 240 further comprises a pawl portion 256 which is engaged with the slider 71 to latch the slider 71 on the chassis 70.

In FIG. 6, the slider 71 is arranged on the chassis 70. The slider 71 includes side walls 61a and 61b. Each of the side walls 61a and 61b is formed with two guide opening portions 62 which are slanted with respect to the horizontal direction. The slider 71 includes an eject portion 63 and an extended portion 65 at front and rear edges of the side wall 61a. The slider 71 is integrally formed with a connecting portion 64 in the side wall 61a. The eject portion 63 is connected with an eject button of the magnetic disk unit. The connecting portion 64 is connected with the pawl portion 256 of the latch lever.

Figure 8:
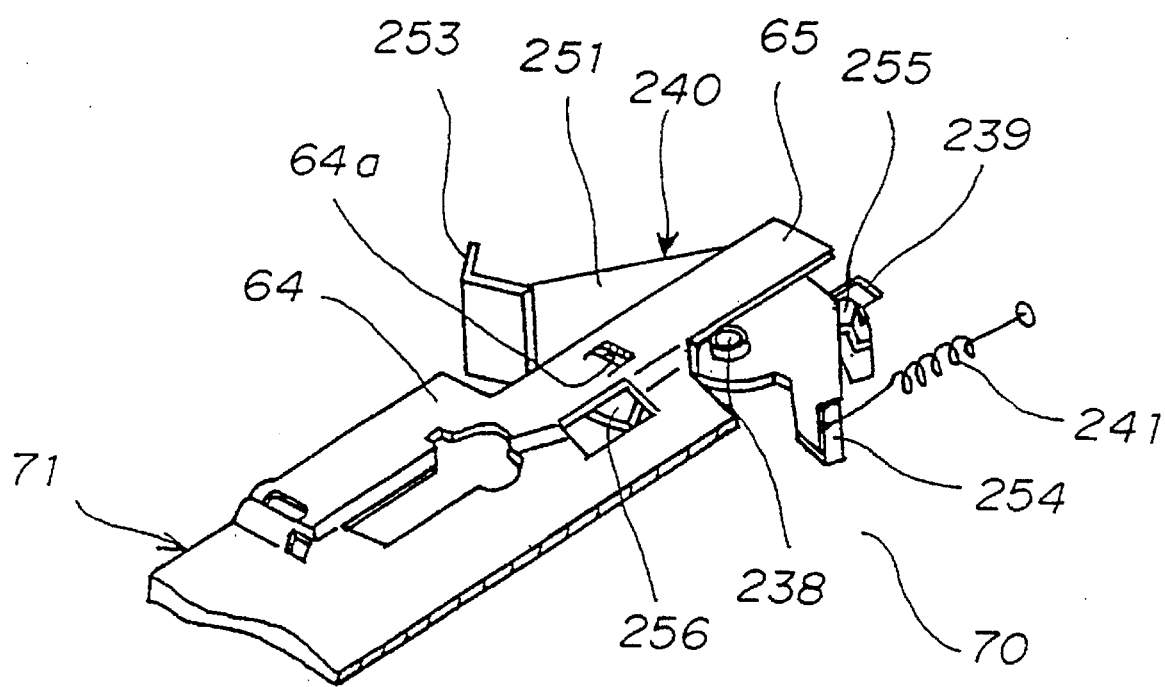
FIG. 8 is a perspective view showing an assembled condition of the latch lever in the disk drive unit in FIG. 6.

FIG. 8 shows an assembled condition of the latch lever 240 on the chassis 70 in FIG. 6. In the assembled condition, the extended portion 65 of the slider 71 is located over the central hole 252 of the latch lever in order to prevent the removal of the latch lever 240 from the chassis 70. The connecting portion 64 of the slider is formed with a step on the slider, and a downwardly bent pawl 64a is formed at a given position of the connecting portion 64. When the latch lever 240 is rotated by a 3.5-inch disk cartridge being inserted, the pawl portion 256 of the latch lever 240 is connected with the pawl 64a of the connecting portion 64 so that the slider 71 is latched by the latch lever 240.

If the latch lever 240 is rotated by the coil spring 241 or the inserted disk cartridge, the removal of the latch lever 240 from the chassis 70 can be prevented by means of the engagement portion 255 and the extended portion 65 in the second embodiment. Fitting the E-ring 146 on the latch lever 143 on the disk drive unit 14 using the ring mounting member 145, as shown in FIG. 2A, is not needed. Thus, the second embodiment enables efficient assembly of the magnetic disk apparatus with a smaller number of manufactured parts while the need for the apparatus which is compact and low in the manufacturing cost is satisfied.

Unlike the disk drive unit 14 in FIG. 2A, the disk drive unit 52 in the second embodiment includes the chassis 70 which is formed with the projection 238 having a low height, and it does not require the pin 140 having a relatively great height on the chassis. Thus, the second embodiment enables efficient assembly of the magnetic disk apparatus while the need for the apparatus which is compact and low in the manufacturing cost.

In FIG. 6, the chassis 70 has holder supporting portions 75 and 76. The supporting portions 75 and 76 vertically extend from the surface of the chassis 70, and the holder 72 is supported on the holder supporting portions 75 and 76 after the holder 72 is arranged on the chassis 70. The holder 72 includes two transversely extending ribs 72c on each of the side walls 72a and 72b. The ribs 72c of the holder are connected with the guide portions 62 of the slider 71 so that the slider 71 guides the holder 72 to enable a vertical movement of the holder within the disk drive unit 52.

An arch-like shutter lever 74 is arranged with a spring 74c on the holder 72. The shutter lever 74 is rotatable around a shaft 74a. The spring 74c is connected at one end to the holder 72 and connected at the other end to the shutter lever 74. The spring 74c gives a biasing force to maintain the original position of the shutter lever 74. The leading edge of the shutter lever 74 is guided along the periphery of a slot 74b in the holder 72. When a 3.5-inch disk cartridge is inserted into the disk drive unit 52, a shutter of the inserted disk cartridge is opened by the shutter lever 74.

Figure 2B:
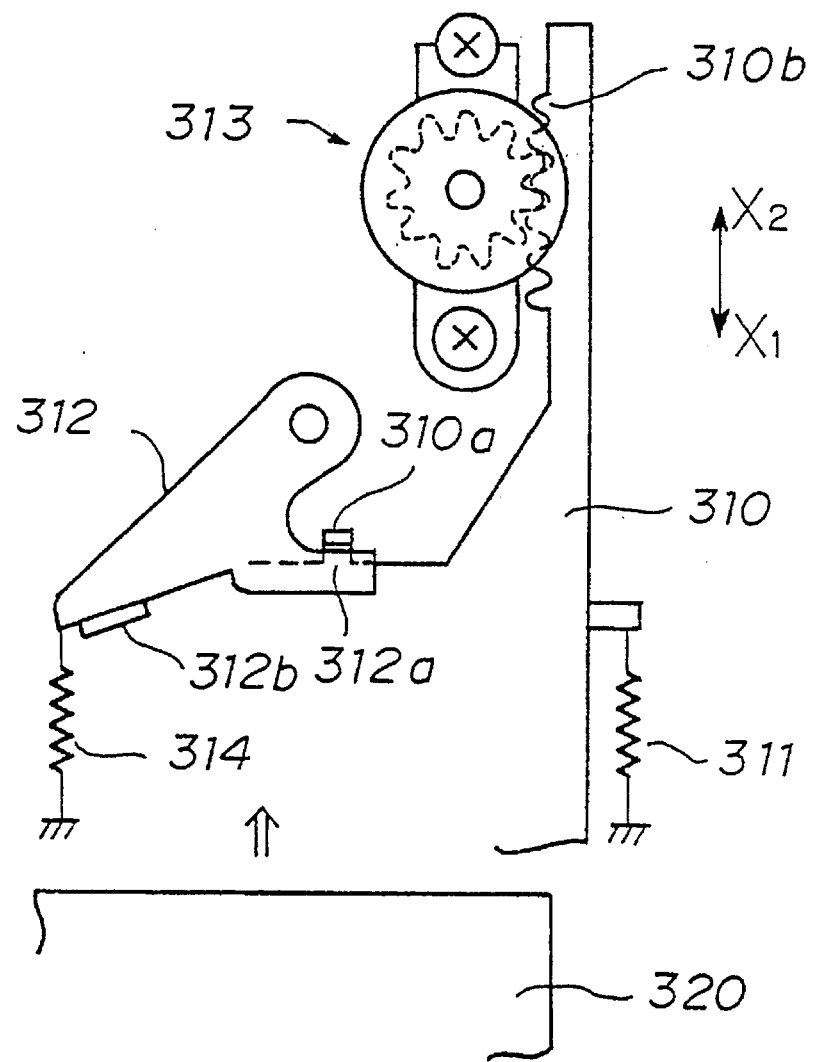

Next, a description will be given of a slider braking mechanism of a conventional disk drive device, with reference to FIG. 2B, for the sake of comparative analysis with the present invention. FIG. 2B shows a slider braking mechanism of a conventional 3.5-inch disk drive device.

In FIG. 2B, a slider 310 and a latch lever 312 are arranged on a chassis (not shown) of the 3.5-inch disk drive unit. The latch lever 312 is rotatably supported on the chassis. A spring 314 connected to the chassis provides a biasing force to rotate the latch lever 312. The slider 310 is slidable on the chassis in directions indicated by arrows X1 and X2 in FIG. 2B. A return spring 311 connected to the chassis gives a biasing force to draw back the slider 310 in the direction indicated by the arrow X1.

The slider 310 includes an upwardly extending hook 310a, and the latch lever 312 includes an arm portion 312a. In FIG. 2B, the slider 3,10 is latched by the latch lever 312 at a latch position where the arm portion 312a is connected with the hook 310a.

The slider braking mechanism in FIG. 2B includes an oil damper 313. The oil damper 313 has a case and a fin whose shaft is rotatable within oil enclosed in the case. The fin of the oil damper 313 is engaged with a rack portion 310b of the slider 310.

When a 3.5-inch disk cartridge 320 is inserted into the disk drive unit and held in a holder (not shown), an upwardly extending portion 312b of the latch lever 312 is pushed by the leading edge of the inserted disk cartridge. The latch lever 312 is thus rotated against the biasing force of the spring 314.

The arm portion 312a of the latch lever 312 at this time is released from the hook 310a of the slider 310, and the slider is moved relative to the chassis in the direction X1 because of the biasing force of the return spring 311.

As the slider 310 is moved relative to the chassis in the direction X1, the holder in which the disk cartridge 320 is held is lowered relative to the chassis, so that a 3.5-inch disk contained in the disk cartridge 320 is set to a read/write position within the disk drive unit.

Generally, an oil damper is expensive, and the manufacturing cost of the disk drive unit becomes high if the oil damper is used by the disk drive unit.

The oil damper 313 serves to brake the slider 310 when the slider 310 is moved relative to the chassis in the direction X1. The braking action of the oil damper 313 helps the slider 310 be slowly moved in the direction X1. Thus, the disk in the disk cartridge 320 can be set to the read/Write position at an appropriate speed.

However, the viscosity of the oil used in the oil damper 313 varies depending on the ambient temperature. Therefore, the braking performance of the oil damper 313 also varies depending on the ambient temperature of the environment where the magnetic disk apparatus is placed. For example, when the ambient temperature is low, the braking force provided by the oil damper 313 is increased. The moving speed of the slider 310 at this time is extremely low, and it is accordingly difficult to set the disk in the disk cartridge 320 to the read/write position. The center hole of the disk at this time may not completely fitted into a rotating shaft of a disk motor within the disk drive unit, which will cause a trouble of the reading/writing of the disk in the disk drive unit.

Next, a description will be given of the magnetic disk apparatus in the third embodiment of the present invention, with reference to FIGS. 9 through 11. The magnetic disk apparatus in the third embodiment includes a slider braking mechanism to enable a safe and reliable setting of an inserted disk cartridge within the apparatus by braking a sliding movement of the slider, and is designed to satisfy the need for the apparatus which is compact and low in the manufacturing cost.

Figure 10:
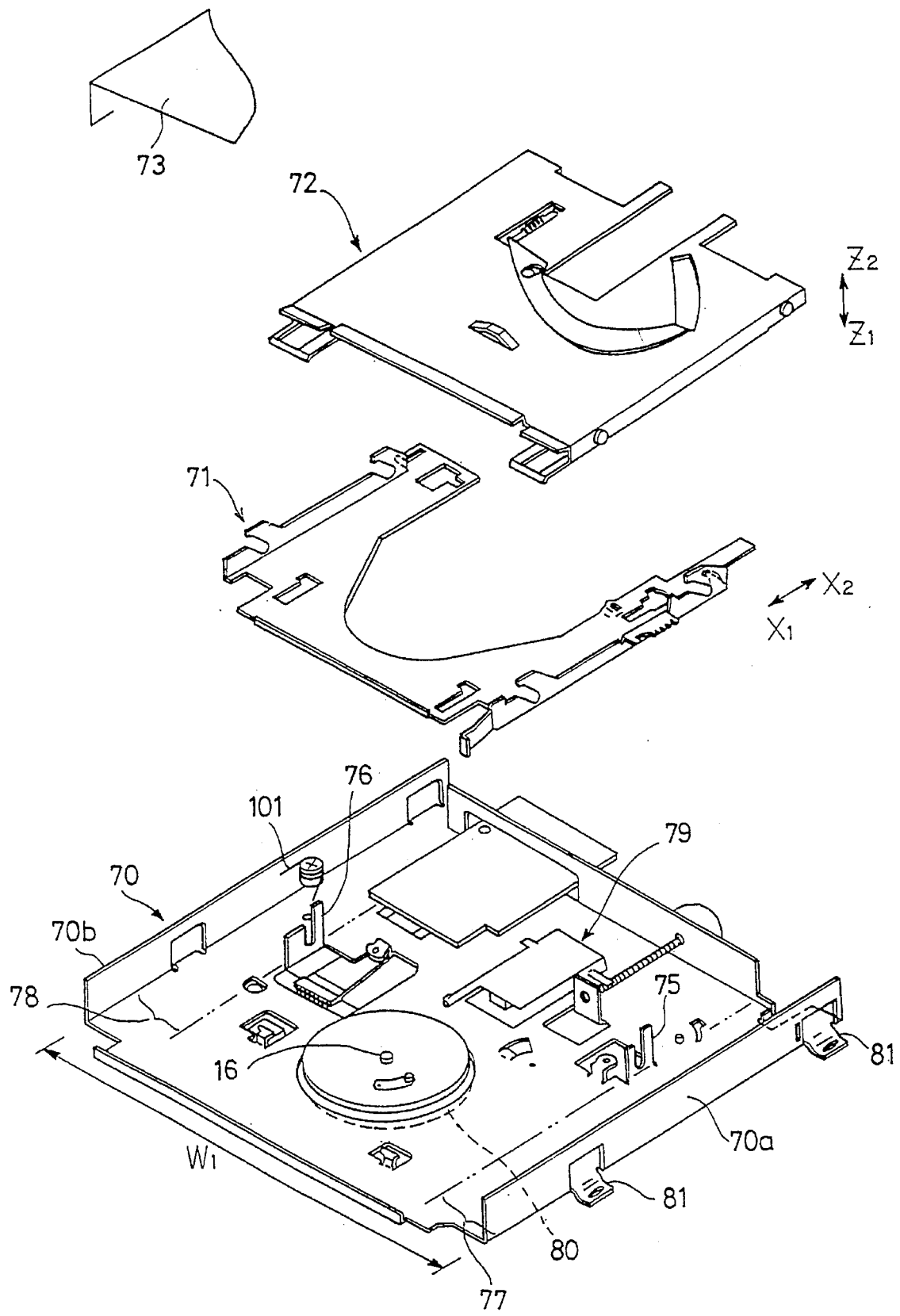
FIG. 10 is a perspective exploded view of a 3.5-inch disk drive unit in which the slider braking mechanism in FIG. 9 is incorporated.

FIG. 10 shows a 3.5-inch disk drive unit of the magnetic disk apparatus in the third embodiment. In FIG. 10, a slider 71, a holder 72 and a cover 73 are arranged on a chassis 70 of the 3.5-inch disk drive unit. Each of the slider 71, the holder 72 and the cover 73 is arranged according to the size equivalent to the 3.5-inch disk cartridge 41. The disk drive unit in FIG. 10 is essentially the same as those shown in FIGS. 5 and 6, except that a slider braking mechanism including a torsion coil spring 101 is arranged in the extended surface portion 78 of the chassis 70. The torsion coil spring 101 has a portion which is connected with or released from the slider when it is moved relative to the chassis.

Similarly to the second embodiment described above, the magnetic disk apparatus in the third embodiment is built by combining two disk drive units of different types into a single unit. The 3.5-inch disk drive unit in the third embodiment includes a latch lever 240 which is rotatably supported on the chassis 70.

The latch lever 240 serves to latch the slider 71 at a given latch position on the chassis 70. The latch lever 240 comprises a rotating body 251, a central hole 252, a contact portion 253, and an engagement portion 255. The rotating body 251 is rotatable around the central hole 252. The contact portion 253 is pushed by the leading edge of the 3.5-inch disk cartridge when it is inserted. The engagement portion 255 is slidably engaged with the chassis 70.

The latch lever 240 is arranged on the chassis 70 with a coil spring 241. The latch lever 240 comprises a hook portion 254. The coil spring 241 is connected at one end with the hook portion 254, and is connected at the other end with a side wall 70a of the chassis 70. The chassis 70 is formed with a projection 238 and a semi-circular guide opening 239 in the surface plate 70c at given positions. The central hole 252 of the latch lever is fitted into the projection 238, and the engagement portion 255 of the latch lever is slidably engaged with the guide opening 239 of the chassis.

The engagement portion 255 of the latch lever 40 is L-shaped in a vertical cross-section. The engagement portion 255 is extending outward and projects downward from the rotating body 251, and the hook portion 254 is extending upward from the rotating body 251. The latch lever 240 further comprises a pawl portion 256 which is engaged with the slider 71 to latch the slider 71 on the chassis 70.

The slider 71 is arranged on the chassis 70. The slider 71 includes side walls 61a and 61b. Each of the side walls 61a and 61b is formed with two guide opening portions 62 which are slanting with respect to the horizontal direction. The slider 71 includes an eject portion 63 and an extended portion 65 at front and rear edges of the side wall 61a. The slider 71 is integrally formed with a connecting portion 64 in the side wall 61a. The eject portion 63 is connected with an eject button of the magnetic disk unit. The connecting portion 64 is connected with the pawl portion 256 of the latch lever.

In an assembled condition of the latch lever 240, the extended portion 65 of the slider 71 is located over the central hole 252 of the latch lever in order to prevent the removal of the latch lever 240 from the chassis 70. The connecting portion 64 of the slider is formed with a step on the slider, and a downwardly bent pawl 64a is formed at a given position of the connecting portion 64. When the latch lever 240 is rotated by a 3.5-inch disk cartridge being inserted, the pawl portion 256 of the latch lever 240 is connected with the pawl 64a of the connecting portion 64 so that the slider 71 is latched by the latch lever 240.

When a 3.5-inch disk cartridge is inserted into the disk drive unit and held by the holder 72, the contact portion 253 of the latch lever 240 is pushed by the leading edge of the inserted disk cartridge. The latch lever 312 is rotated against the biasing force of the spring 241.

The connecting portion 256 of the latch lever 240 at this time is released from the hook 64a of the slider 71, the slider 71 is moved relative to the chassis 70 in the direction indicated by the arrow X1 in FIG. 10 because of a biasing force of a return spring.

As the slider 71 is moved relative to the chassis 70 in the direction X1, the holder 72 in which the disk cartridge is held is lowered relative to the chassis 70 in the direction indicated by the arrow Z1 in FIG. 10, so that a 3.5-inch disk contained in the disk cartridge is set to a read/write position within the disk drive unit.

When the slider 71 is moved relative to the chassis 70 in the direction X1, a slider braking mechanism 100 of the third embodiment serves to brake the slider 71. The braking action of the slider braking mechanism 100 helps the slider 71 be slowly moved in the direction X1, and the disk in the disk cartridge can be set to the read/write position at an appropriate speed.

Figure 9:
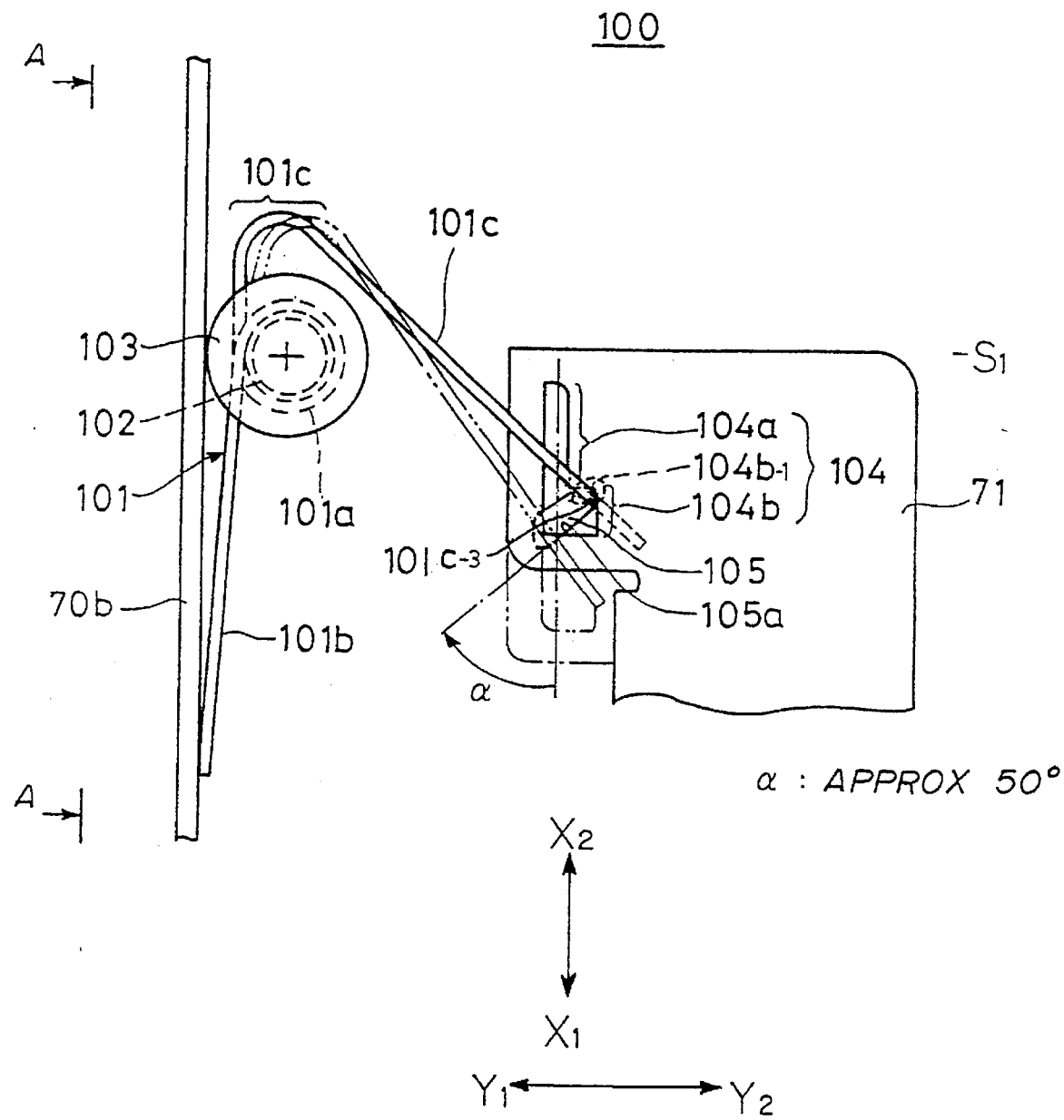
FIG. 9 is a plan view showing a slider braking mechanism of a magnetic disk apparatus in a third embodiment of the present invention.

FIG. 9 shows the slider braking mechanism 100 of the magnetic disk apparatus in the third embodiment. FIG. 11 is a side view of the slider braking mechanism taken along a line A—A in FIG. 9. In FIG. 11, the side wall 70b shown in FIG. 9 is omitted.

Figure 12A:
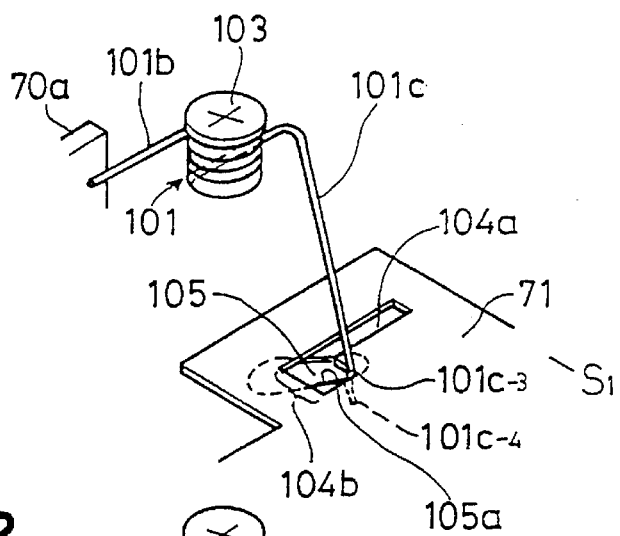
FIGS. 12A through 12D are diagrams for explaining the operation of the slider braking mechanism in FIG. 9.
Figure 12B:
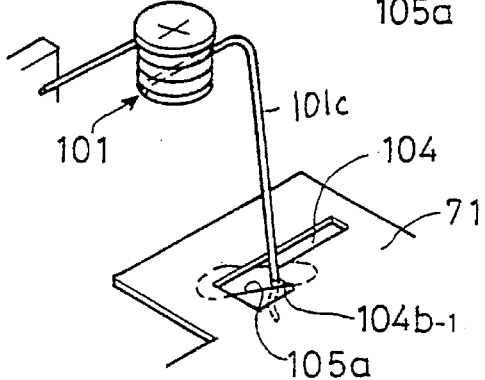
Figure 12C:
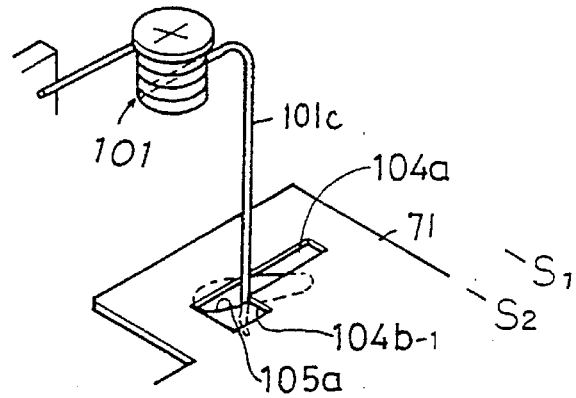
Figure 12D:
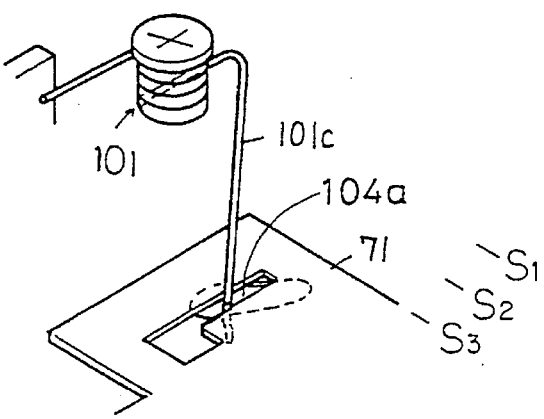

FIGS. 12A and 13A show a condition of the slider braking mechanism 100 when the slider 71 is not moved relative to the chassis 70 in the direction X1. FIGS. 12D and 13D show a condition of the slider braking mechanism 100 after the sliding movement of the slider 71 is completed. FIGS. 12B and 13B show an intermediate condition of the slider braking mechanism 100 in the course of the sliding movement of the slider 71. FIGS. 12C and 13C show an intermediate condition of the slider braking mechanism 100 when the braking force of the torsion coil spring to brake the slider 71 is canceled.

In FIG. 9, the position of the torsion coil spring 101 when the slider 71 is not moved relative to the chassis 70 in the direction X1 is indicated by solid lines, and the position of the torsion coil spring 101 after the sliding movement of the slider 71 is completed is indicated by two-dot chain lines.

Figure 11:
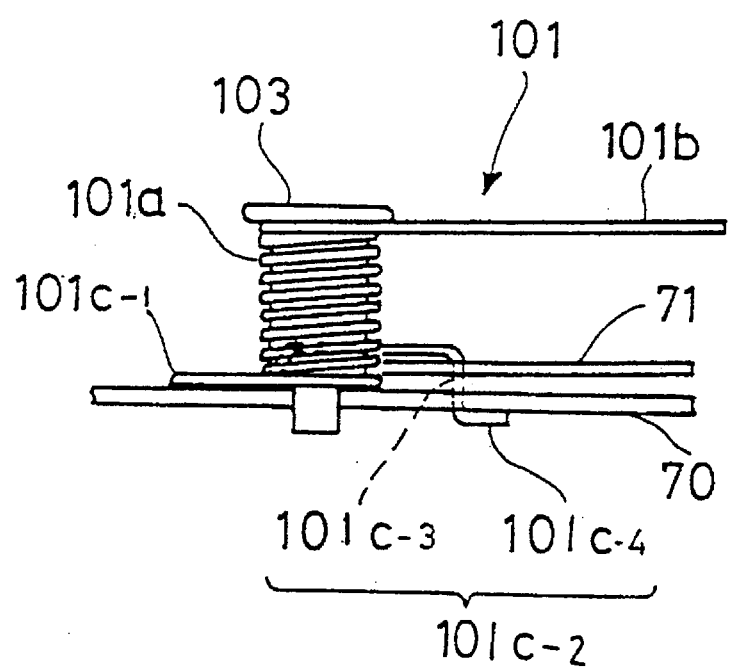
FIG. 11 is a sectional view of the slider braking mechanism taken along a line A—A in FIG. 9.

In FIGS. 9 and 11, the slider braking mechanism 100 comprises the torsion coil spring 101, an upwardly extending pin 102 of the chassis 70, and a machine screw 102. The torsion coil spring 101 includes a coil portion 101a, a first arm portion 101b extending from the coil portion 101a, and a second arm portion 101c extending from the coil portion 101a in the direction opposite to the first arm portion 101b.

The coil portion 101a is fitted into the pin 102 of the chassis 70, and the screw 103 is fastened to the pin 102 so as to prevent the removal of the torsion coil spring 101 from the pin 102. The first arm portion 101b is connected with the side wall 70b of the chassis 70.

AS shown in FIGS. 9 and 11, the second arm portion 101c of the torsion coil spring 101 is shaped into a predetermined three-dimensional figure by bending. The second arm portion 101c comprises a U-shaped part 101c-1 around the coil portion 101a, and an L-shaped part 101c-2 at a leading edge of the torsion coil spring 101. The L-shaped part 101c-2 includes a vertical segment 101c-3 and a horizontal segment 101c-4.

In FIG. 9, an L-shaped slit 104 is formed at a left corner portion of the slider 71. The L-shaped slit 104 comprises a longitudinally extending first slit portion 104a, and a second slit portion 104b which is transversely extending from an edge of the first slit portion 104a. The first slit portion 104a is longer than a stroke of the sliding movement of the slider 71 in the directions X1 and X2 in FIG. 9. The second slit portion 104b has an edge 104b-1.

The chassis 70 of the 3.5-inch disk drive unit 52 includes a guide opening 105 at a location corresponding to the location of the L-shaped slit 104 of the slider 71. The guide opening 105 has a guide edge 105a. The guide edge 105a of the guide opening 105 is formed into a generally straight line, and the line of the guide edge 105a is preset to be slanting, so that it is at an angle "α" (approximately 50°) with the direction X1 in which the slider 71 is moved relative to the chassis 70. In other words, the chassis 70 is formed with the guide opening 105 such that the guide edge 105a generally extends along an arc drawn around the U-shaped part 101c-1 as the center of the arc.

FIGS. 9, 12A and 13A show the condition of the slider braking mechanism 100 when the slider 71 is not moved relative to the chassis 70 in the direction X1. The second slit portion 104b of the slider at this time matches with the guide opening 105. The L-shaped part 101c-2 of the second arm portion passes through the second slit portion 104b of the slider and the guide opening 105 of the chassis 70. The horizontal segment 101c-4 at the leading edge of the second arm portion is placed under the bottom of the chassis 70, so as to prevent the removal of the torsion coil spring 101 from the slider 71 and the chassis 70. The vertical segment 101c-3 of the torsion coil spring is placed at the right corner of the edge 104b-1 of the L-shaped slit 104 of the slider, so as to prevent the slider 71 from being moved in both the direction X2 and the direction Y2.

In FIG. 9, the second arm portion 101c is resiliently deformed in the direction X1, and the slider 71 is moved in the direction X2 due to the biasing force given by the torsion coil spring 101.

When the 3.5-inch disk cartridge 41 is inserted into the disk drive unit 52, the latch lever is released from the slider 71, and the slider 71 is moved relative to the chassis 70 in the direction X1 due to a biasing force of a coil spring. A position of the rear edge of the slider 71 before the sliding movement mentioned above is indicated by "S1" in FIGS. 9, 12A–12D and 13A–13D.

The slider 71 has two stages of the sliding movements in the direction X1. In the first stage (FIGS. 12A–12C and FIGS. 13A–13C), the slider 71 is moved relative to the chassis 70 in the direction X1 while the biasing force from the torsion coil spring 101 so as to move the slider 71 in the opposite direction X2 is applied to the slider 71. In the second stage (FIGS. 12C–12D and FIGS. 13C–13D), the slider 71 is moved relative to the chassis 70 in the direction X1 while no biasing force from the torsion coil spring 101 is applied to the slider 71.

As shown in FIGS. 12B and 13B, the slider 71 is moved relative to the chassis 70 in the direction X1 against the biasing force given by the torsion coil spring 101. During this sliding movement, the vertical segment 101c-3 of the torsion coil spring is pushed by the edge 104b-1 of the second slit portion 104b of the slider 71, and the vertical segment 101c-3 is guided by the guide edge 105a of the chassis. In other words, when the slider 71 is sliding in the direction X1, a braking force from the slider braking mechanism 100 is applied to the slider 71 so as to move the slider 71 at an decreasing sliding speed.

As shown in FIGS. 12C and 13C, the slider 71 is moved relative to the chassis 70 in the direction X1 to reach a position at which the vertical segment 101c-3 of the torsion coil spring 101 is separated from the edge 104b-1 of the second slit portion 104b of the slider 71. A position of the rear edge of the slider 71 in this condition is indicated by "S2" in FIGS. 12C–12D and 13C–13D.

As shown in FIGS. 12D and 13D, after the vertical segment 101c-3 is separated from the edge 104b-1, the biasing force given by the slider braking mechanism 100 is not applied to the slider 71, and the slider 71 is further moved relative to the chassis 70 in the direction X1 at an increasing speed to a rear end position of the slider 71 on the chassis 70. The rear end position of the slider 71 in this condition is indicated by "S3" in FIGS. 12D and 13D. The vertical segment 101c-3 of the torsion coil spring 101 at this position is within the first slit portion 104a of the slider 71. As the slider 71 is moved relative to the chassis 70 in the direction X1 at a prescribed speed to the rear end position, the holder 72 is moved down relative to the chassis 70 in the direction Z1 at the prescribed speed.

Therefore, the 3.5-inch disk cartridge held by the holder 72 can be set to the read/write position within the 3.5-inch disk drive unit with no interference between the parts of the disk drive unit being caused. As the biasing force from the slider braking mechanism 100 is not applied to the slider 71, the slider can be moved to the rear end position at the prescribed sliding speed.

As the slider braking mechanism 100 described above has the torsion coil spring 101, the characteristics of the slider braking mechanism 100 are not influenced by any change in the ambient temperature of the magnetic disk apparatus, even when the temperature of the environment in which the magnetic disk apparatus is placed is very low. Unlike the oil damper in the above conventional device, the slider braking mechanism 100 described above is inexpensive and serves to stably and safely set the inserted 3.5-inch disk cartridge to the read/write position within the disk drive unit while it is not influenced by any change in the ambient temperature of the magnetic disk apparatus.

When an eject button of the magnetic disk apparatus is depressed, the slider 71 is moved relative to the chassis 70 in the direction X2. After the disk cartridge is ejected from the magnetic disk apparatus, the slider 71 is returned back to the position S1 in FIG. 9. The sequence of sliding movements of the slider 71 at that time is opposite to that of the sliding movements of the slider shown in FIGS. 12A–12D and 13A–13D, but the slider braking mechanism 100 at that time has no braking effect on the slider 71.

The slider braking mechanism 100 including the torsion coil spring 101 shown in FIG. 11 has a structure which satisfies the need for the 3.5-inch disk drive unit which is compact, and the torsion coil spring 101 is inexpensive as compared with the oil damper. In the third embodiment described above, it is possible that a magnetic disk apparatus designed to satisfy the need for the apparatus which is compact and low in the manufacturing cost has a slider braking mechanism which enables a safe and reliable setting of an inserted disk cartridge in the apparatus.

Figure 2C:
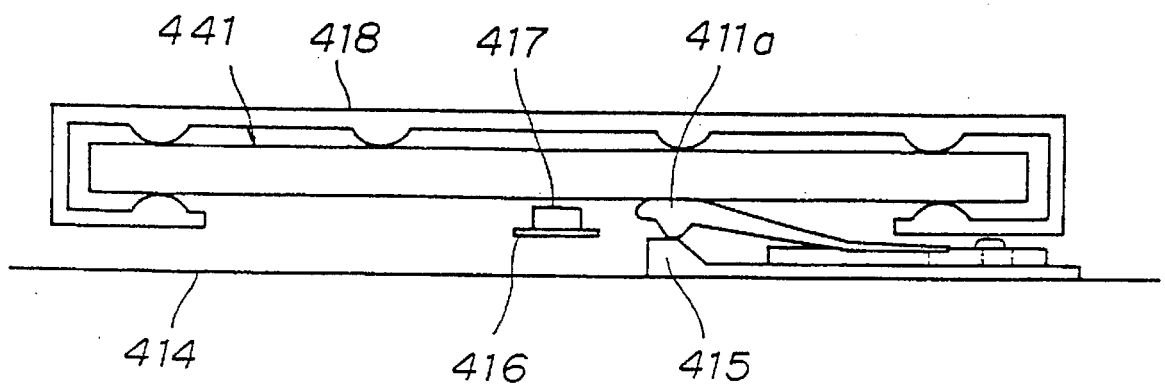

Next, a description will be given of a cartridge impact preventing mechanism of a conventional disk drive unit, with reference to FIG. 2C, for the sake of comparative analysis with a fourth embodiment of the present invention. FIG. 2C is a cross sectional view of the cartridge impact preventing mechanism taken along a transversal line in the above conventional device.

The cartridge impact preventing mechanism in FIG. 2C includes a transversely movable guide member, a rotatably supported L-shaped lever, and a projecting portion of a chassis of a 3.5-inch disk drive unit. The guide member includes at its leading edge a guide portion which a disk cartridge is brought into contact with. The L-shaped lever is provided between the guide portion and a slider of the disk drive unit. In FIG. 2C, the 3.5-inch disk drive unit includes the chassis 414, the holder 418, and a head carriage unit 416. The guide portion 411a of the guide member is placed on the top of the projecting portion 415 on the chassis 414, and the top of the guide member 411 is arranged at a position within the disk drive unit slightly higher than the top of a lower magnetic head 417 on the head carriage unit 416.

When a 3.5-inch disk cartridge 441 is inserted into the holder 418, the inserted disk cartridge is placed on the top of the guide member 411. The guide member 411 serves to prevent the disk cartridge from hitting the lower magnetic head 417. However, the cartridge impact preventing mechanism mentioned above is comprised of too many parts: the guide member, the L-shaped lever and the projecting portion. The above mentioned mechanism of the conventional device requires a relatively large space to incorporate the mechanism in the disk drive unit. As the guide member is arranged on the top of the projecting portion arranged on the chassis, the above conventional mechanism requires a relatively large height to be provided within the disk drive unit. Thus, it is difficult to satisfy the need for the magnetic disk apparatus which is compact and low in the manufacturing cost.

Next, a description will be given of a cartridge impact preventing mechanism of a magnetic disk apparatus in a fourth embodiment of the present invention, with reference to FIGS. 14 through 19B.

Figure 14:
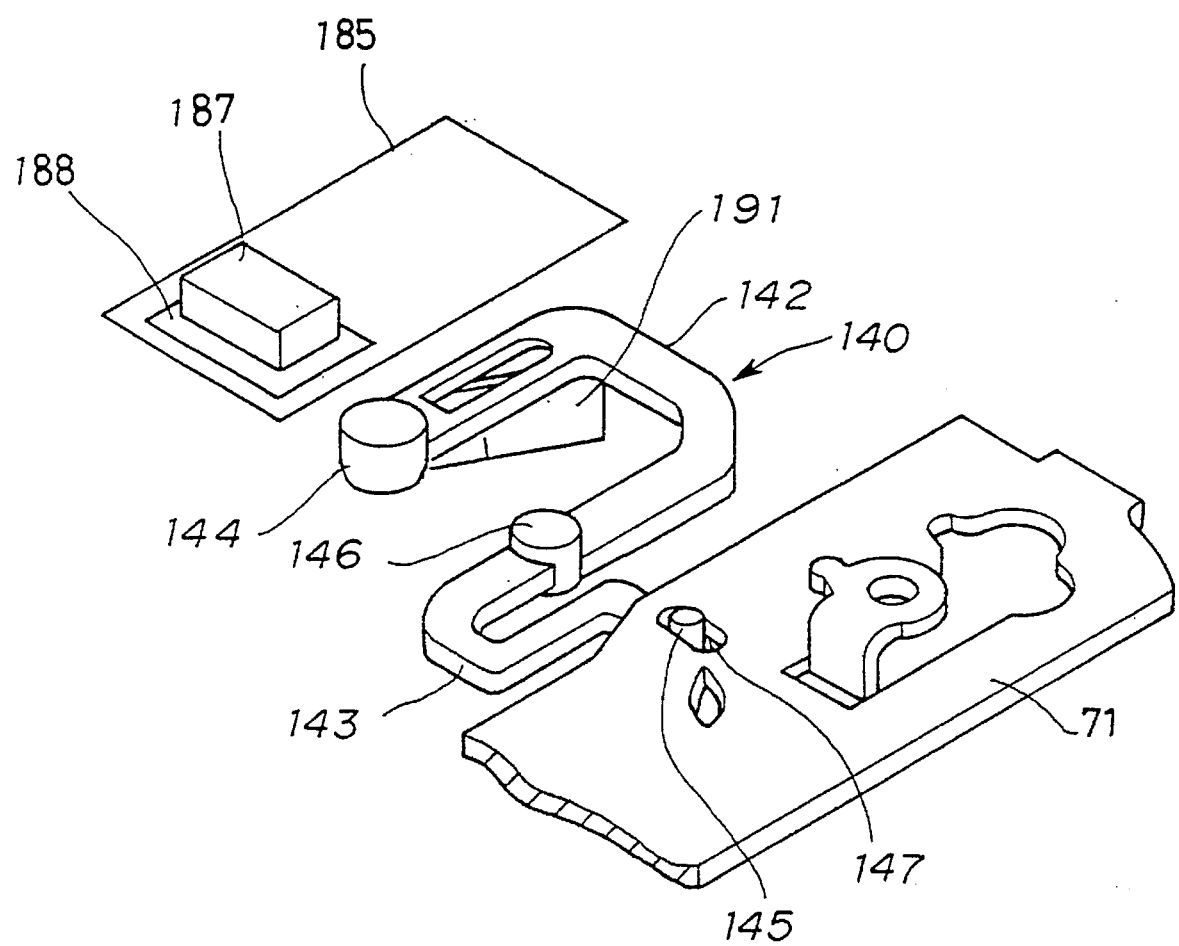
FIG. 14 is a perspective view of a cartridge impact preventing mechanism of a magnetic disk apparatus in a fourth embodiment of the present invention.
Figure 15:
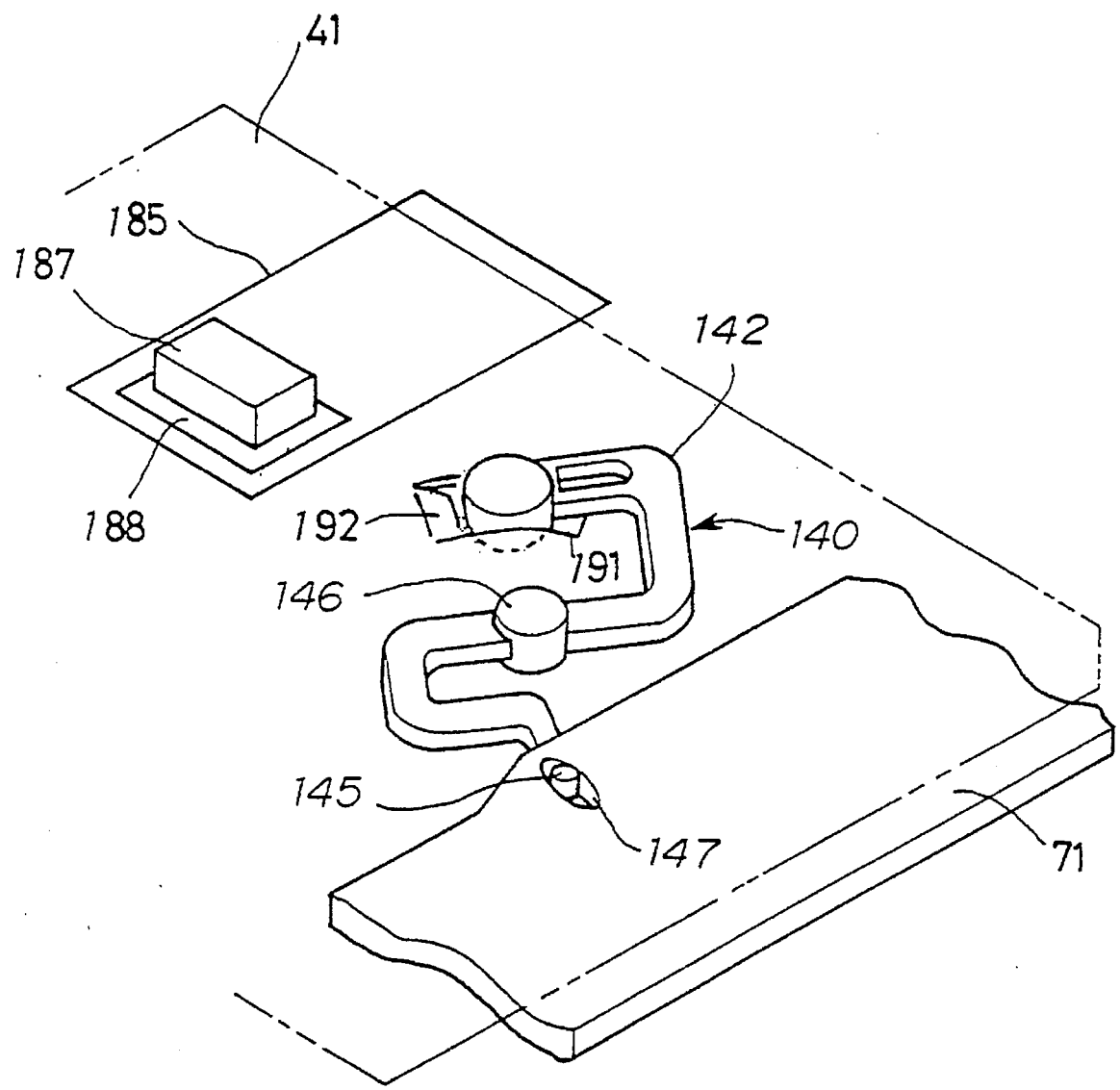
FIG. 15 is a perspective view of the cartridge impact preventing mechanism in FIG. 14.
Figure 18A:
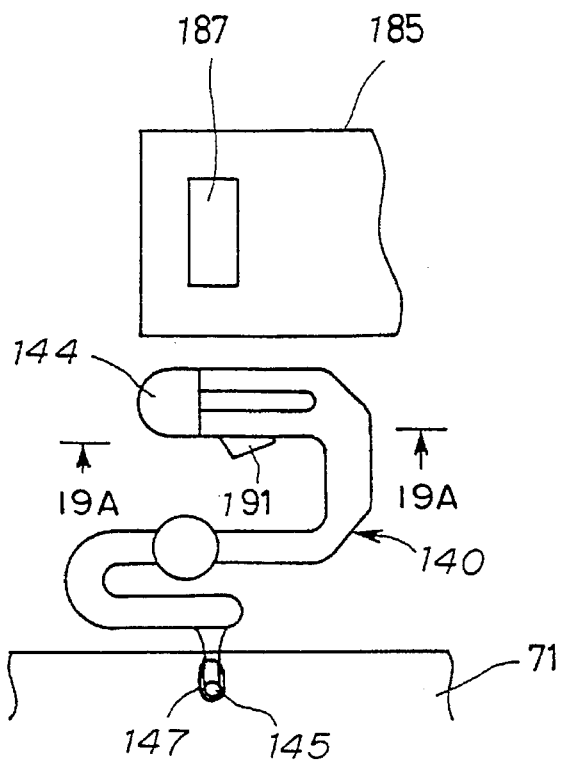
FIGS. 18A and 18B are diagrams for explaining the operation of the disk cartridge guide member in FIGS. 17A through 17D.
Figure 18B:
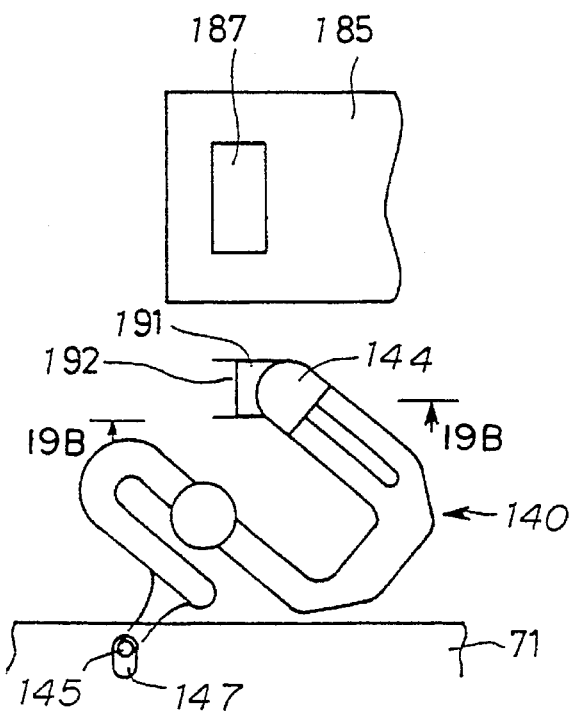
Figure 19A:
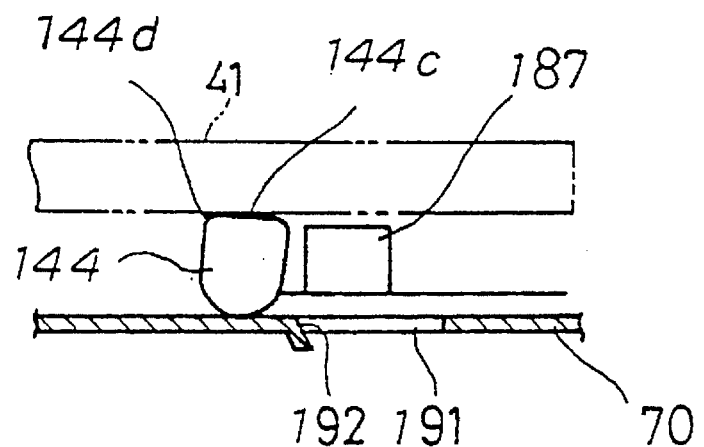
FIGS. 19A and 19B are sectional views of the disk cartridge guide member taken along lines A—A and B—B in FIGS. 18A and 18B, respectively.
Figure 19B:
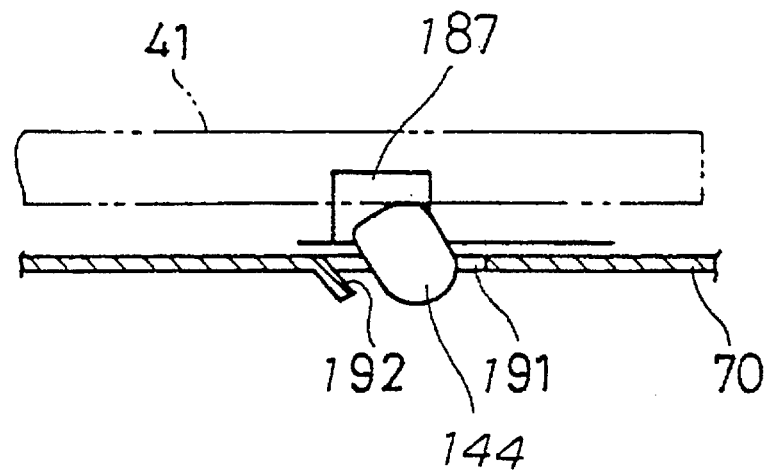

FIGS. 14, 18A and 19A show a condition of the cartridge impact preventing mechanism in the fourth embodiment before a disk cartridge is inserted. FIGS. 15, 18B and 19B show a condition of the cartridge impact preventing mechanism after the disk cartridge is inserted and set to the read/write position.

Figure 16:
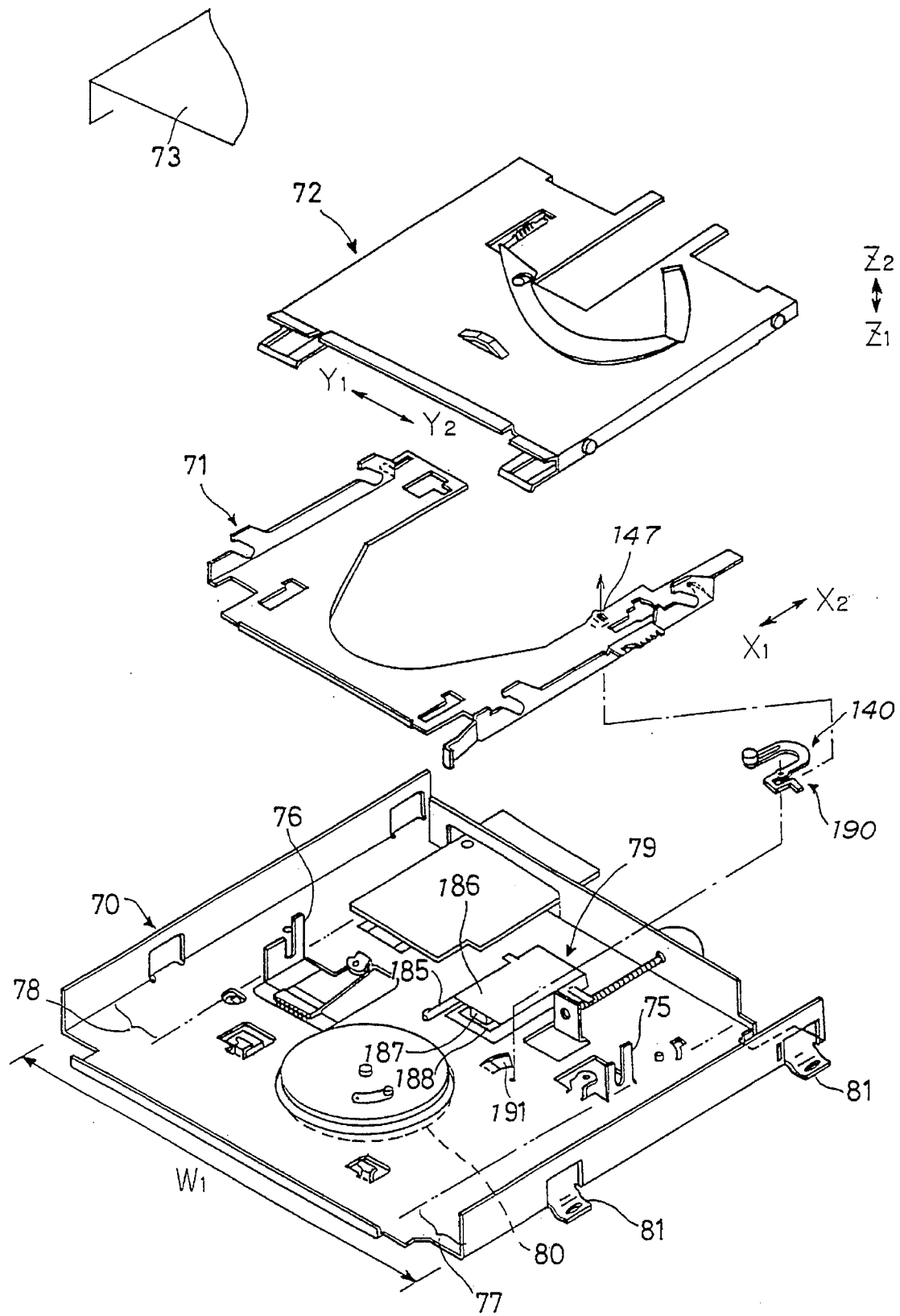
FIG. 16 is a perspective exploded view of a 3.5-inch disk drive unit of the magnetic disk apparatus in which the cartridge impact preventing mechanism in FIG. 14 is incorporated.

FIG. 16 shows a 3.5-inch disk drive unit of the magnetic disk apparatus in which the cartridge impact preventing mechanism in FIG. 14 is incorporated. In FIG. 16, the head carriage unit 79 is supported on the chassis 70 of the 3.5-inch disk drive unit. The head carriage unit 79 includes a lower arm portion 185 and an upper arm portion 186, and, on the lower arm portion 185, there is provided a magnetic head 187 via a gimbal plate 188.

The chassis 70 in the fourth embodiment includes an opening 191 in the vicinity of the front end of the head carriage unit 79, and this opening 191 includes a slanting surface 192. The opening 191 of the chassis is formed so that a cartridge guide portion 144, which will be described below, is engaged with the opening 191. The slanting surface 192 of the opening 191 is arranged so that the cartridge guide portion 144 is smoothly disengaged from the opening 191 of the chassis.

FIGS. 17A through 17D show a disk cartridge guide member 140 of the cartridge impact preventing mechanism in the fourth embodiment in FIG. 14. In FIGS. 17A through 17D, the disk cartridge guide member 140 includes a bearing 141, a first U-shaped arm 142, a second U-shaped arm 143, the cartridge guide portion 144, and a connecting portion 145. The disk cartridge guide member 140 is a molded part which is made of synthetic resin.

The first U-shaped arm 142 includes a base portion 142a extending from the bearing 141, and a thin, resiliently-deformable arm portion 142b extending from the base portion 142a. The arm portion 142b has a given thickness "t". The bottom surface of the first U-shaped arm 142 includes a flat projection 142c at the end of the base portion 142a near the arm portion 142b. The flat projection 142c forms the base of the disk cartridge guide member 140 which is brought into contact with the chassis 70. The disk cartridge guide member 140 is horizontally supported on the chassis 70 by use of the flat projection 142c even if a burr is projecting from the bottom surface of the base portion 142a or if the bottom surface of the base portion 142a has a warping.

The thin, resiliently-deformable arm portion 142b includes a slit 142b-1, and two separated arm segments 142b-2 and 142b-3 which are separated from each other by the slit 142b-1. The separated arm segments 142b-2 and 142b-3 are resiliently deformable, independently of each other, without interference, and the arm portion 142b can be smoothly twisted in directions indicated by arrows "A" and "B" in FIG. 17D.

The cartridge guide portion 144 includes an upwardly-projecting head 144a, extending from the arm portion 142b, and a downwardly-projecting, semi-spherical base 144b. The head 144a includes a top surface 144c with a slanting surface 144d which is formed slantingly at the front side of the top surface 144c.

The second U-shaped arm 143 extends from the bearing 141 in the direction opposite to the direction of the first U-shaped arm 142. The second U-shaped arm 143 is U-shaped in order to increase the area of the disk cartridge guide member 140 which contacts with the chassis 70 and to allow a reliable and safe rotating movement of the member 140 on the chassis 70. In addition, a rotating force acts on the first U-shaped arm 142 in the direction, indicated by the arrow "C" in FIG. 17C, when the cartridge guide portion 144 is engaged with the opening of the chassis by the inserted disk cartridge. The second U-shaped arm is U-shaped in order to cancel the rotating force mentioned above so as to prevent the first U-shaped arm 142 from being raised from the chassis 70.

The connecting portion 145 extends from the second U-shaped arm 143, and it includes an upwardly projecting portion which is engaged with the slider 71.

The disk cartridge guide member 140 described above is rotatably arranged on the chassis 70 by supporting the bearing 141 on a shaft 146 on the chassis 70 and by fitting the connecting portion 145 into a slot 147 in the slider 71.

As described above, the disk cartridge guide member 140 is in the condition shown in FIGS. 14, 18A and 19A before the 3.5-inch disk cartridge 41 is inserted. In FIG. 19A, the cartridge guide portion 144 is placed on the chassis 70, and the position of the cartridge guide portion 144 is located slightly in front of a magnetic head 187 of the head carriage unit 79 in the direction X1. The top surface 144c of the cartridge guide portion is located slightly above the magnetic head 187.

When the 3.5-inch disk cartridge 41 is inserted into the holder 72, the disk cartridge 41 does not contact the magnetic head 187. The disk cartridge 41 is guided by the slanting surface 144d of the cartridge guide portion and slides along the top surface 144c thereof, so that the inserted disk cartridge 41 is placed above the magnetic head 187. Thus, by means of the disk cartridge guide member 140, the disk cartridge 41 can be inserted into the holder 72 at its rear end position without interfering with the magnetic head 187.

As the disk cartridge 41 is inserted into the holder 72 at its rear end position, the slider 71 is released from the latch lever (not shown) and is moved relative to the chassis 70 in the direction X1 by the biasing force of the spring (not shown).

When the slider 71 is moved in the direction X1, the disk cartridge guide member 140 is in the condition shown in FIGS. 15, 18B and 19B. The disk cartridge guide member 140 is rotated around the shaft 146 by the sliding movement of the slider 71. The cartridge guide portion 144 at this time is placed above the opening 191 of the chassis 70.

As the holder 72 is lowered relative to the chassis 70 in the direction Z1 by the sliding movement of the slider 71, the disk cartridge 41 held by the holder 72 is also lowered in the direction Z1. The cartridge guide portion 144 is pushed downward by the disk cartridge 41, and the arm segments 142b-2 and 142b-3 of the arm portion 142b are resiliently deformed. As shown in FIG. 19B, the cartridge guide portion 144 at this time is engaged with the opening 191 of the chassis 70. Thus, the inserted disk cartridge 41 is safely set to the read/write position within the disk drive unit.

The arm segments 142b-2 and 142b-3 are resiliently deformable, independently of each other, and the cartridge guide portion 144 can be smoothly connected with the opening 191 of the chassis as shown in FIG. 19B.

As the arm portion 142b can be smoothly twisted in the directions indicated by the arrows "A" and "B" in FIG. 17D, the cartridge guide portion 144 can be smoothly engaged with the opening 191 of the chassis.

The rotating force acts on the first U-shaped arm 142 in the direction indicated by the arrow "C" in FIG. 17C, when the cartridge guide portion 144 is engaged with the opening 191 of the chassis. However, the second U-shaped arm 143 at this time is supported on the chassis 70, thereby preventing the first U-shaped arm 142 from moving upward from the chassis 70.

On the other hand, when the disk cartridge 41 is ejected from the disk drive unit, the operations of the disk cartridge guide member 100 at that time is reversal to the above described operations of the disk cartridge guide member 100.

More specifically, the slider 71 is moved relative to the chassis 70 in the direction X2 when the eject button is depressed, and the holder 72 is raised from the chassis 70 in the direction Z2. The disk cartridge guide member 140 is rotated around the shaft 146. The cartridge guide portion 144 is smoothly released from the opening 191 of the chassis since the downwardly-projecting, semi-spherical base 144b is guided by the slanting surface 192 of the opening 191.

As an alternative of the above mentioned opening 191 of the chassis 70, a recessed portion equivalent to the opening 191 may be formed in the chassis 70 at the corresponding location. The recessed portion as the alternative has a slating surface equivalent to the slanting surface 192.

The magnetic disk apparatus in the fourth embodiment has a cartridge impact preventing mechanism which can be built by a single disk cartridge guide member. The disk cartridge impact guide member in the fourth embodiment is inexpensive since it is a molded part made of synthetic resin, and has a simple, flat structure which can be incorporated into a 3.5-inch disk drive unit. Thus, the magnetic disk apparatus in the fourth embodiment can satisfy the need for the apparatus which is compact and low in the manufacturing cost, and the cartridge impact preventing mechanism enables a safe and reliable holding of an inserted disk cartridge and prevents the disk cartridge from impacting a magnetic head when the disk cartridge is set to a read/write position.

Figure 2D:
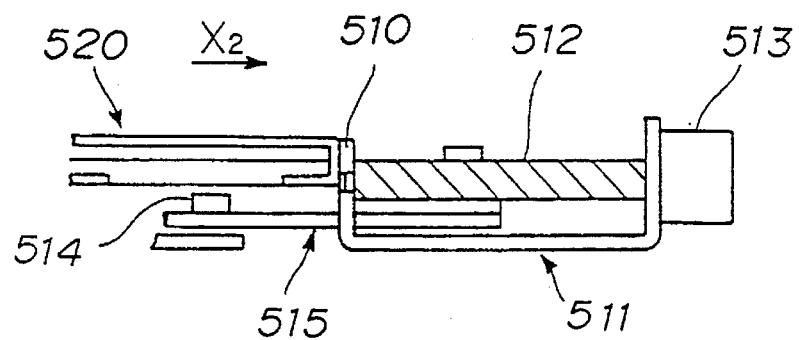

Next, a description will be given of an impact prevention mechanism of a conventional magnetic disk device, with reference to FIG. 2D, for the sake of comparative analysis with the present invention. FIG. 2D shows an impact prevention mechanism of a conventional disk drive device.

In FIG. 2D, an upright wall 510 upwardly extending from a chassis 511 of the above conventional device is provided. The chassis 511 is made of a sheet metal, and the upright wall 510 is formed by partially cutting the sheet metal of the chassis 511 and bending the cut part of the sheet metal. A lead screw 512 is arranged at a rear portion of the chassis 511, and this lead screw 512 is rotated by a stepping motor 513 to move a head carriage unit 515 in a radial direction of a magnetic disk. A magnetic head 514 to access the magnetic disk is provided on the head carriage unit 515. The lead screw 512 is supported at one end by the upright wall 510.

When a disk cartridge 520 is forcibly inserted in the direction X2 by an operator, the leading edge of the inserted disk cartridge 520 impacts the upright wall 510 of the above disk drive device. If the disk cartridge 520 is inserted by use of a strong force, the upright wall 510 may be permanently deformed so that it slantingly extends from the chassis 511. The deformation of the upright wall 510 makes the alignments of the lead screw 512 and the magnetic head 514 deviate from the desired alignment lines. Therefore, the above conventional device has a problem in that the disk contained in the disk cartridge 520 may be accessed by using such a magnetic head, and the disk is fatally damaged. In order to eliminate this problem, it is necessary to provide a magnetic disk apparatus including an impact preventing mechanism which prevents the leading edge of an inserted disk cartridge from impacting a wall of a chassis on which a lead screw is supported.

Next, a description will be given of an impact prevention mechanism of a magnetic disk apparatus in a fifth embodiment of the present invention, with reference to FIGS. 20 through 24.

Figure 20:
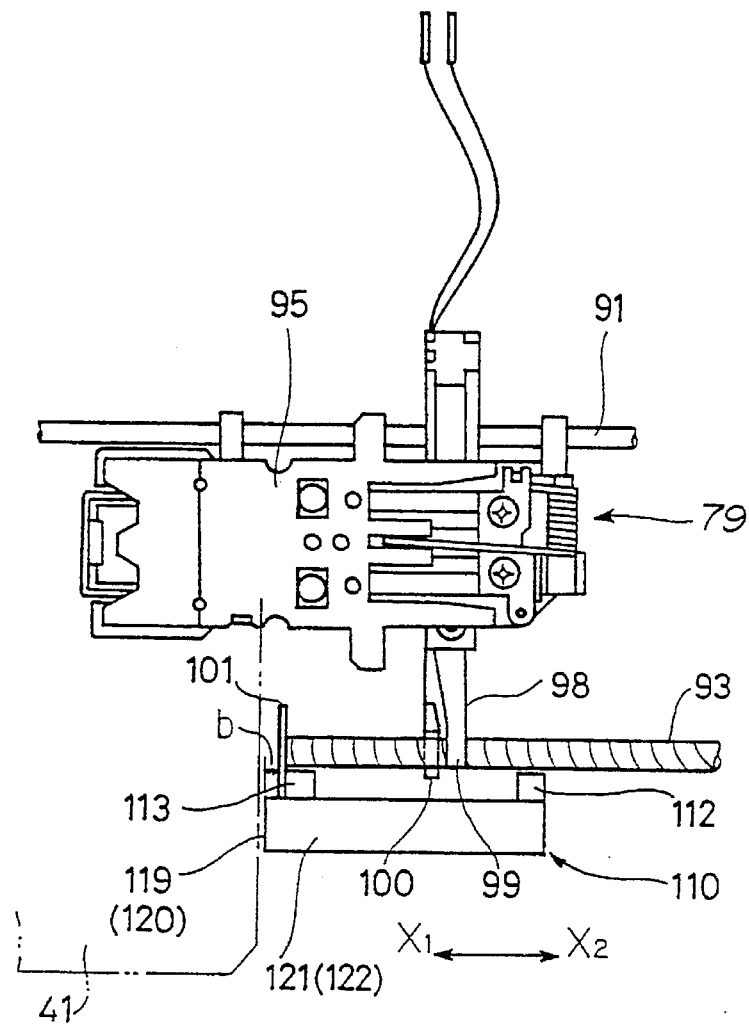
FIG. 20 is a plan view of an impact prevention mechanism of a magnetic disk apparatus in a fifth embodiment of the present invention.
Figure 21:
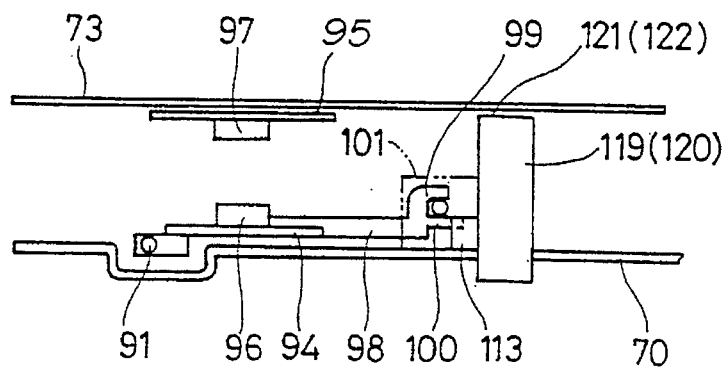
FIG. 21 is a front view of the impact prevention mechanism of the magnetic disk apparatus in FIG. 20.

FIGS. 20 and 21 show the impact prevention mechanism of the magnetic disk apparatus in the fifth embodiment. In FIGS. 20 and 21, there are provided the head carriage unit 79, a guide rod 91, a lead screw 93, a lower arm 94, and an upper arm 95. The guide rod 91 guides the head carriage unit 79 when it is moved relative to the chassis 70 in directions indicated by arrows "X1" and "X2" in FIG. 20. The lead screw 93 is rotated by a stepping motor (not shown) to move the head carriage unit 79 in the directions X1 and X2.

In the head carriage unit 79, a lower magnetic head 96 is provided on the top of the lower arm 94, and an upper magnetic head 97 is provided on the bottom of the upper arm 95. A transversely extending arm 98 is provided on the side of the head carriage unit 79, and the arm 98 is connected with the lead screw 93. The arm 98 includes at its leading end an upper connecting portion 99 and a lower connecting portion 100. The lower connecting portion 100 is slightly longer than the upper connecting portion 99, and transversely extends beyond the lead screw 93. The lead screw 93 is interposed between the two connecting portions 99 and 100.

At the front end of the lead screw 93, a supporting wall 101 upwardly extending from the chassis 70 is provided. The lead screw 93 is supported by the supporting wall 101. The chassis 70 is made of a sheet metal, and the supporting wall 101 is formed by partially cutting the sheet metal of the chassis 70 and bending the cut part of the sheet metal.

Figure 23:
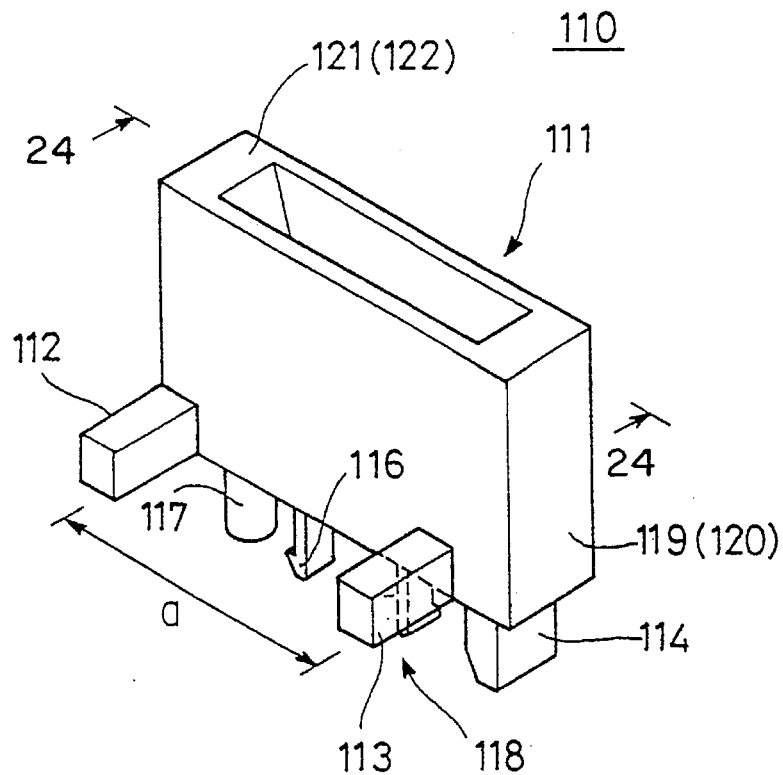
FIG. 23 is a perspective view of a stopper member of the impact prevention mechanism in FIG. 20.
Figure 24:
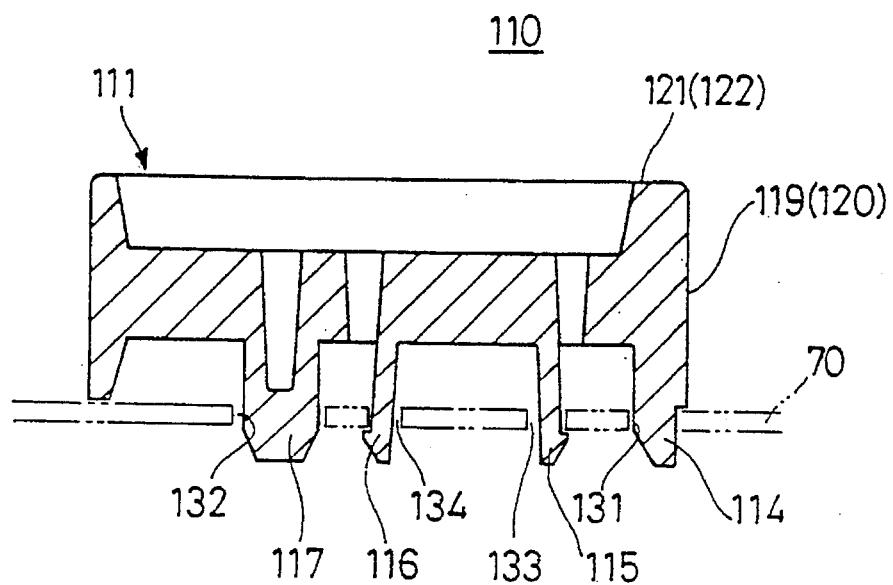
FIG. 24 is a sectional view of the stopper member in FIG. 23.

FIGS. 23 and 24 show a stopper member 110 of the impact prevention mechanism in the fifth embodiment in FIG. 20. The stopper member 110 is a molded product made of synthetic resin. The stopper member 110 comprises a rectangular main body 111, a pair of ribs 112 and 113 transversely extending from the side of the main body, a fixing portion 114, a pair of latching legs 115 and 116, and a locating pin 117. The fixing portion 114, the latching legs 115 and 116, and the locating pin 117 are downwardly extending from the bottom of the main body 110 as shown.

The ribs 112 and 113 are arranged on the side of the main body 111, and they are apart from each other along the side of the main body 111 by a prescribed distance "a" that is slightly longer than the stroke of the movement of the head carriage unit 79 in the directions X1 and X2.

The stopper member 110 has a front-end surface 119 which serves as a first stopper 120 to prevent the leading edge of an inserted disk cartridge from impacting the supporting wall 101.

The transversely extending ribs 112 and 113 serve as a second stopper 118 to prevent the head carriage unit 79 from impacting the disk motor 80 or a rear end wall 86 of the chassis 70.

The stopper member 110 has a top surface 121 which serves as a third stopper 122 to prevent the cover 73 from impacting the head carriage unit 79 when the disk drive unit is gripped by a hand of an assembly robot by use of a strong force.

As shown in FIGS. 20 and 21, the stopper member 110 is fitted to the chassis 70 so that it lies adjacent to the lead screw 93.

Figure 22:
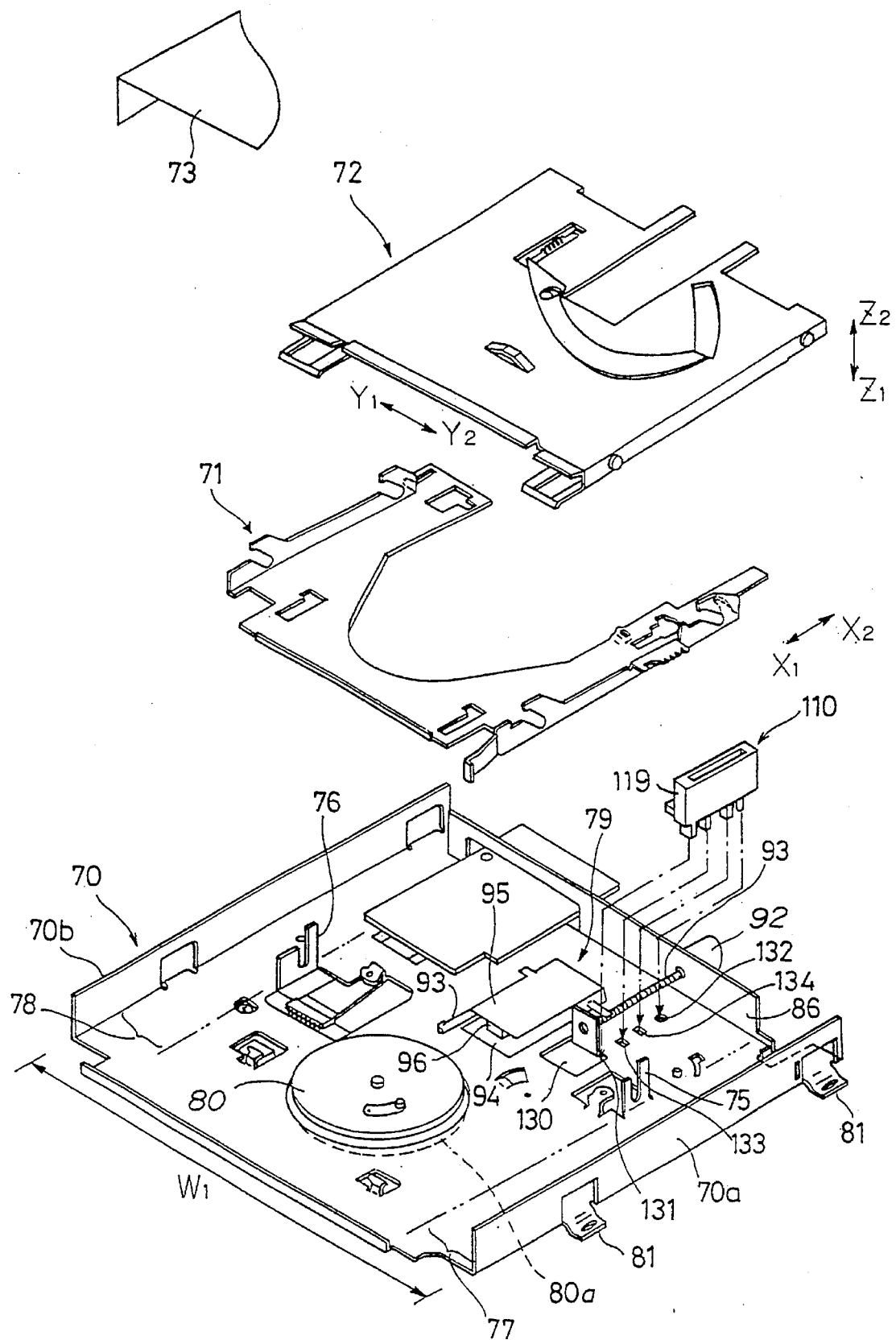
FIG. 22 is a perspective exploded view of a 3.5-inch disk drive unit of the magnetic disk apparatus in which the impact prevention mechanism in FIG. 20 is incorporated.

FIG. 22 shows a 3.5-inch disk drive unit of the magnetic disk apparatus in which the impact prevention mechanism in FIG. 20 is incorporated. As shown in FIG. 22, the stopper member 110 is arranged on the chassis 70 by fitting the fixing portion 114 to a recessed portion 131 of an opening 130, fitting the locating pin 117 to a hole 132, and connecting the latching legs 115 and 116 to holes 133 and 134 respectively. In FIG. 22, a stepping motor 92 is provided behind the rear end wall 86 of the chassis 70, and the stepping motor 92 is connected to the lead screw 93 to rotate the lead screw 93.

As shown in FIG. 20, the front end surface 119 of the stopper member is located at a position that deviates from the position of the supporting wall 101 in the forward direction X1 on the chassis 70 by a prescribed distance "b". Thus, the front end surface 119 of the stopper member serves as the first stopper 120 mentioned above. The top surface 121 of the stopper member is located beneath the cover 73 of the disk drive unit. The top surface 121 serves as the third stopper 122 mentioned above.

If the disk cartridge 41 is inserted into the disk drive unit 52 by use of a strong inserting force, the leading edge of the inserted disk cartridge 41 comes to a position indicated by a two-dot chain line in FIG. 20. The leading edge of the inserted disk cartridge 41 at that time does not impact the supporting wall 101 and hits the front end surface 119 of the stopper member 110.

Any inserting force to insert the disk cartridge 41 is canceled by the first stopper 120 mentioned above when the leading edge of the disk cartridge 41 touches the front end surface 119 of the stopper member 110. Thus, it is possible to prevent the leading edge of an inserted disk cartridge from impacting the supporting wall 101 even if a strong force is used to insert the disk cartridge 41. As the supporting wall 101 is not at all hit by the inserted disk cartridge, the supporting wall 101 is never permanently deformed. The lead screw 93 is supported by the supporting wall 101, and the head carriage unit 79 is connected with the lead screw 93. As the supporting wall 101 is never deformed, it is possible to prevent the alignment of the magnetic head 96 on the head carriage unit 79 from deviating from the desired alignment line.

If the stepping motor 92 should malfunction, the head carriage unit 79 may exceed a desired range of the movement in the directions X1 and X2. However, in the magnetic disk apparatus including the impact prevention mechanism described above, when the head carriage unit 79 is excessively moved relative to the chassis 70 in the direction X1, the lower connecting portion 100 of the arm 98 is brought into contact with the rib 113 of the stopper member 110. On the other hand, when the head carriage unit 79 is excessively moved relative to the chassis 70 in the direction X2, the lower connecting portion 100 of the arm 98 is brought into contact with the rib 112 of the stopper member 110. Therefore, the forward and backward movements of the head carriage unit 79 are restricted by the stopper member 110. It is possible to prevent the head carriage unit 79 from impacting the disk motor 80 or the rear end wall 86 of the chassis.

When the magnetic disk apparatus is assembled by use of an assembly robot, the disk drive unit is occasionally gripped by a hand of the assembly robot. The chassis 70 and the cover 73 of the disk drive unit 52 are depressed by use of a strong force. If the cover 73 is exceedingly deformed, the head carriage unit 79 may be damaged by the bottom of the cover 73 due to the depressing force. However, in the magnetic disk apparatus including the impact prevention mechanism described above, when the cover 73 is exceedingly deformed, the bottom of the cover 73 is supported by the top surface 121 of the stopper member. Thus, it is possible to prevent the cover 73 from impacting the head carriage unit 79 by means of the third stopper 122 of the stopper member mentioned above.

Further, the present invention is not limited to the above described embodiments, and variations and modifications may be made without departing from the scope of the present invention.

What is claimed is:

1. A magnetic disk apparatus formed by combining two disk drive units of different types into a single unit, said magnetic disk apparatus being suitable for being received in a housing through an opening having a predetermined height, said apparatus comprising:

a first disk drive unit capable of accessing a first-size disk contained in a first disk cartridge, said first disk drive unit having an open area top; and a second disk drive unit capable of accessing a smaller, second-size disk contained in a second disk cartridge, the second disk drive unit being attached to the first disk drive unit to form a unitary magnetic disk apparatus unit having an overall height established by the individual heights of said first and second disk drive units;

said second disk drive unit comprising:
a chassis having a size substantially equal to a size of the first disk drive unit;
a disk motor which is coupled to, and which rotates, the second-size disk of the second disk cartridge when the second-size disk is accessed; and a motor base attached to a bottom of said disk motor, said motor base including a control circuit to control the rotation of the disk motor, wherein an open top area of the first disk drive unit is covered with the chassis of the second disk drive unit, the open top area of the first disk drive allowing the height of the second disk drive to be increased while establishing the overall height of the magnetic disk apparatus at the predetermined height, said chassis including a hole at a position outwardly deviating from a side of a holder attached to the chassis, and a positioning screw provided in said hole, said positioning screw being used to adjust a fitted position of the second disk drive unit over the first disk drive unit by viewing an index mark on the first disk drive unit through said hole.

2. A magnetic disk apparatus according to claim 1, wherein said first disk cartridge is a disk cartridge containing a 5-inch disk, and said second disk cartridge is a disk cartridge containing a 3.5-inch disk.

3. A magnetic disk apparatus according to claim 1, wherein said disk motor extends into the open top area of said first disk drive unit, thereby to allow the height of said disk motor to be increased.

* * * * *